US012645062B2

(12) United States Patent
Wang

(10) Patent No.: US 12,645,062 B2
(45) Date of Patent: \*Jun. 2, 2026

(54) SIGHT

(71) Applicant: Peng Wang, Yueyang (CN)

(72) Inventor: Peng Wang, Yueyang (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 19/283,522

(22) Filed: Jul. 29, 2025

(65) Prior Publication Data

US 2025/0355238 A1 Nov. 20, 2025

Related U.S. Application Data

(63) Continuation of application No. 18/588,596, filed on Feb. 27, 2024, now Pat. No. 12,399,359.

(51) Int. Cl.
*G02B 23/16* (2006.01)
(52) U.S. Cl.
CPC ................................... *G02B 23/16* (2013.01)
(58) Field of Classification Search
CPC ...................................................... G02B 23/16
USPC .......................................................... 359/818
See application file for complete search history.

(56) References Cited

U.S. PATENT DOCUMENTS

2002/0067408 A1\* 6/2002 Adair .................... G06F 1/1686
348/66
2008/0013175 A1\* 1/2008 Laganas ............... G03B 17/561
359/503

\* cited by examiner

*Primary Examiner* — Bumsuk Won
*Assistant Examiner* — Mitchell T Oestreich

(57) ABSTRACT

A sight includes a main body and an objective lens piece. The main body includes a connection end. A first electric connection assembly is arranged on an end surface of the connection end of the main body. A first connection member is arranged around the first electric connection assembly. A second electric connection assembly is arranged on one end surface of the objective lens piece. A second connection member is arranged around the second electric connection assembly. The second connection member is detachably connected in the first connection member to make the objective lens piece detachably connected to the main body. When the second connection member is connected in the first connection member, the second electric connection assembly is abutted to the first electric connection assembly to make the objective lens piece electrically connected to the main body.

18 Claims, 35 Drawing Sheets

100

100

200

300

SIGHT

CROSS-REFERENCE TO RELATED APPLICATIONS

This application is a continuation application of U.S. application Ser. No. 18/588,596, filed on Feb. 27, 2024, the content of which is incorporated by reference herein.

TECHNICAL FIELD

The present disclosure relates to a sight, and in particular, to a night vision sight, a digital sight, and a dual-lens sight, applied to the field of sighting telescopes.

BACKGROUND ART

Sights, also referred to as optical sights, are mainly classified into the following three categories: telescope sights, collimating optical sights, and reflex sights. The telescopic sights and the reflex sights are the most popular. The above two types of sights are mainly used in the day, so they are collectively referred to as day scopes/sights. In addition, there is a night scope/sight for night aiming. The night scope/sight is formed by adding a night vision device to the above two types of sights. According to the types of night vision devices, the sights can be classified into low light level sights and infrared sights (which can be further classified into active infrared sights and thermal imaging infrared sights).

The sights are applied to widespread scenarios, including military, police, shooting sports, hunting, self-defense, training, and other fields. The sights have quick and accurate aiming capabilities to help users better complete tasks in various situations, so that the sights are increasingly popular. However, as the sights are high-precision instruments having strict processing requirements, the sights are relatively expensive. An objective lens in the sight plays an important adjustment role, and is configured to reflect a target at a distance onto a reticle through optical imaging and make the target overlap a sight line on the reticle, so as to form correct aiming. That is, the objective lens is a very important part in the overall structure of the sight, and the high price is also closely related to the objective lens. However, according to the sight currently sold on the market, the objective lens is integrated with a sight body, and the objective lens and the sight body are inseparable. Therefore, if a focal length of the objective lens is not enough or if a user intends to use various focal lengths, the user can only purchase a new sight to meet the need. Therefore, the integrated arrangement of the objective lens and the sight body is not convenient for the user, which brings troubles. Especially, as the increasingly popular night vision sight, digital sight, and dual-lens sight are expensive, the user cannot use various focal lengths.

SUMMARY

According to the above, in the prior art, in a sight currently sold on the market, an objective lens is integrated with a sight body, and the objective lens and the sight body are inseparable. Therefore, if a focal length of the objective lens is not enough or if a user intends to use various focal lengths, the user can only purchase a new sight to meet the need. This causes the problem of inconvenience in use. The present disclosure provides the sight. The objective lens piece of the sight is separably connected to the main body of the sight through the first connection member and the second connection member. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

The technical solution adopted by the present disclosure to solve the technical problem is as follows.

A sight, wherein the sight includes:

a main body, wherein the main body includes a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body.

Further, the end surface of the connection end of the main body is provided with a first groove; the first electric connection assembly and the first connection member are both arranged in the first groove; an end surface of one end of the objective lens piece connected to the main body is provided with a second groove; the second connection member and the second electric connection assembly are both arranged in the second groove; and when the objective lens piece is mounted on the main body, the second groove wraps around the first groove or the first groove wraps around the second groove.

Further, the first connection member includes a clamping port; the clamping port is arranged on a side wall of the first groove; the second connection member includes a first clamping block and a mounting column; two ends of the mounting column are communicated to each other; the mounting column is arranged in the second groove; the second electric connection assembly is arranged in a through hole of the mounting column; the first clamping block is arranged around an outer side of the mounting column; a gap exists between an end socket of the first clamping block and a side wall of the second groove; the gap accommodates the side wall of the first groove; when the objective lens piece is mounted on the main body, the side wall of the first groove is mounted in the gap, and the second groove wraps around the first groove; or the first connection member includes a first clamping block and a mounting column; two ends of the mounting column are communicated to each other; the mounting column is arranged in the first groove; the first clamping block is arranged around an outer side of the mounting column; a gap exists between an end socket of the first clamping block and the side wall of the first groove; the gap accommodates a side wall of the second groove; and when the objective lens piece is mounted on the main body, the side wall of the second groove is mounted in the gap, and the first groove wraps around the second groove.

Further, the clamping port includes an insertion opening and a sliding rail; the insertion opening is communicated to the sliding rail; the first clamping block is inserted along the insertion opening into the sliding rail and slides in the sliding rail; and the first clamping block is abutted to a side wall of the sliding rail.

Further, the sight further includes a locking member; the locking member is slidably arranged on the main body; one end of the locking member is located in the first groove; the second groove is internally provided with a locking hole; the locking member has a locked position and an unlocked position; when the locking member is in the locked position, the end of the locking member located in the first groove is inserted into the locking hole; and when the locking member is in the unlocked position, the end of the locking member located in the first groove is separated from the locking hole.

Further, the locking member includes an insertion part, a sliding part, and a first elastic member; a sliding space is arranged in the main body; the sliding part slides in the sliding space; the insertion part is arranged at one end of the sliding part and is located in the first groove; the first elastic member is abutted to an opposite end of the sliding part; and when the objective lens piece is rotated to a mounting position, the first elastic member pushes the sliding part to insert the insertion part into the locking hole.

Further, a surface of the main body is provided with a sliding slot; the sliding slot is communicated to the sliding space; a surface of the sliding part is convexly provided with a push part; and the push part is threaded out of the sliding slot.

Further, the push part is provided with an inclined friction surface, and one side of the friction surface close to the insertion part is lower than one side close to the first elastic member.

Further, the sight is a digital sight; the digital sight further includes a liquid crystal display device and a CMOS image sensing device; the liquid crystal display device and the CMOS image sensing device are arranged in the main body; and the liquid crystal display device and the CMOS image sensing device are electrically connected.

Further, the sight is a night vision sight; the night vision sight further includes a first night vision device; and the first night vision device is arranged in the main body.

Further, the sight is a dual-lens sight; the main body of the dual-lens sight includes two connection ends; the two connection ends are arranged side by side; the dual-lens sight further includes a vanadium oxide detector device and a second night vision device; the second night vision device is arranged in one of the connection ends; and the vanadium oxide detector device is arranged in the other connection end.

Further, an end surface of the connection end is provided with a first groove; the first electric connection assembly is arranged in the first groove; an inner wall of the first groove is provided with a first thread; an end surface of one end of the objective lens piece connected to the main body is provided with a second groove; the second electric connection assembly is provided in the second groove; an outer wall of the second groove is provided with a second thread; and the first groove and the second groove are engaged via the first thread and the second thread, so that the objective lens piece is mounted on the main body.

Further, an end surface of the connection end is provided with a first groove; the first electric connection assembly is arranged in the first groove; the first groove includes two extension ends; a gap exists between the two extension ends; end portions of the extension ends include locking ends protruding outwards; the first groove further includes a fastener; the fastener penetrates through the two locking ends; an end surface of one end of the objective lens piece connected to the main body is provided with a second groove; the second electric connection assembly is arranged in the second groove; and when the first groove is inserted into the second groove, the fastener is rotated to enable the two extension ends to be close to each other, so that the second groove abuts against and locks the first groove.

Further, an end surface of the connection end is provided with a first groove; the first electric connection assembly is arranged inside the first groove; the first groove includes two extension ends; a gap exists between the two extension ends; end portions of the extension ends include locking ends protruding outwards; the first groove further includes a locking part; the locking part includes a fixing member; the fixing member includes a first end and a second end; the locking part is rotatably connected to the first end; the fixing member is inserted into the two locking ends; the second end is fixedly connected to one of the locking ends far away from the locking part; the locking part abuts against the other locking end; an end surface of one end of the objective lens piece connected to the main body is provided with a second groove; the second electric connection assembly is arranged in the second groove; the locking part is configured to be in a locked position and an unlocked position; the second groove is arranged in the first groove; when the locking part is in the locked position, the locking part presses against an outer wall of the locking end to make the two locking ends approach each other, so that the first groove locks the second groove; and when the locking part is in the unlocked position, the two locking ends move away from each other to separate the second groove from the first groove.

Further, the locking part includes a first locking key; the first locking key is slidably arranged on the locking part; the first locking key includes a second elastic member and a locking block; the second elastic member and the locking block are slidably arranged inside the locking part; one end of the second elastic member abuts against the locking part; an opposite end of the second elastic member abuts against the first locking key; the locking block is arranged on the first locking key; the first end is provided with a locking hole; and the locking block is configured to be engaged in the locking hole to fix a position of the locking part. Further, the locking part includes a second locking key; the second locking key is rotatably connected to the locking part; the second locking key includes an abutting end protruding outwards; the first end is provided with an abutting surface; and when the abutting end is pressed against the abutting surface, a position of the locking part is fixed.

Further, the sight further includes a base; the base is detachably connected to the main body; and the base is used for connecting an external object.

Further, the base includes a mounting slot; a lower part of the main body includes a connection part; the connection part is configured to be arranged in the mounting slot; the base includes a first mounting hole; the connection part includes a second mounting hole; and when the connection part is mounted in the mounting slot, the first mounting hole corresponds to the second mounting hole in position.

Further, the mounting slot includes a clamping slot; the connection part includes a second clamping block; and the second clamping block is configured to be mounted in the clamping slot.

The present disclosure has the following beneficial effects. The present disclosure provides the sight. The objective lens piece is detachably connected to the main body of the sight by means of a plurality of connection manners of the first connection member and the second connection member. By arranging the locking part, quick installation and disassembly between the objective lens piece and the main body are achieved. By arranging the base, the detachable connection between the sight and a pistol is achieved. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
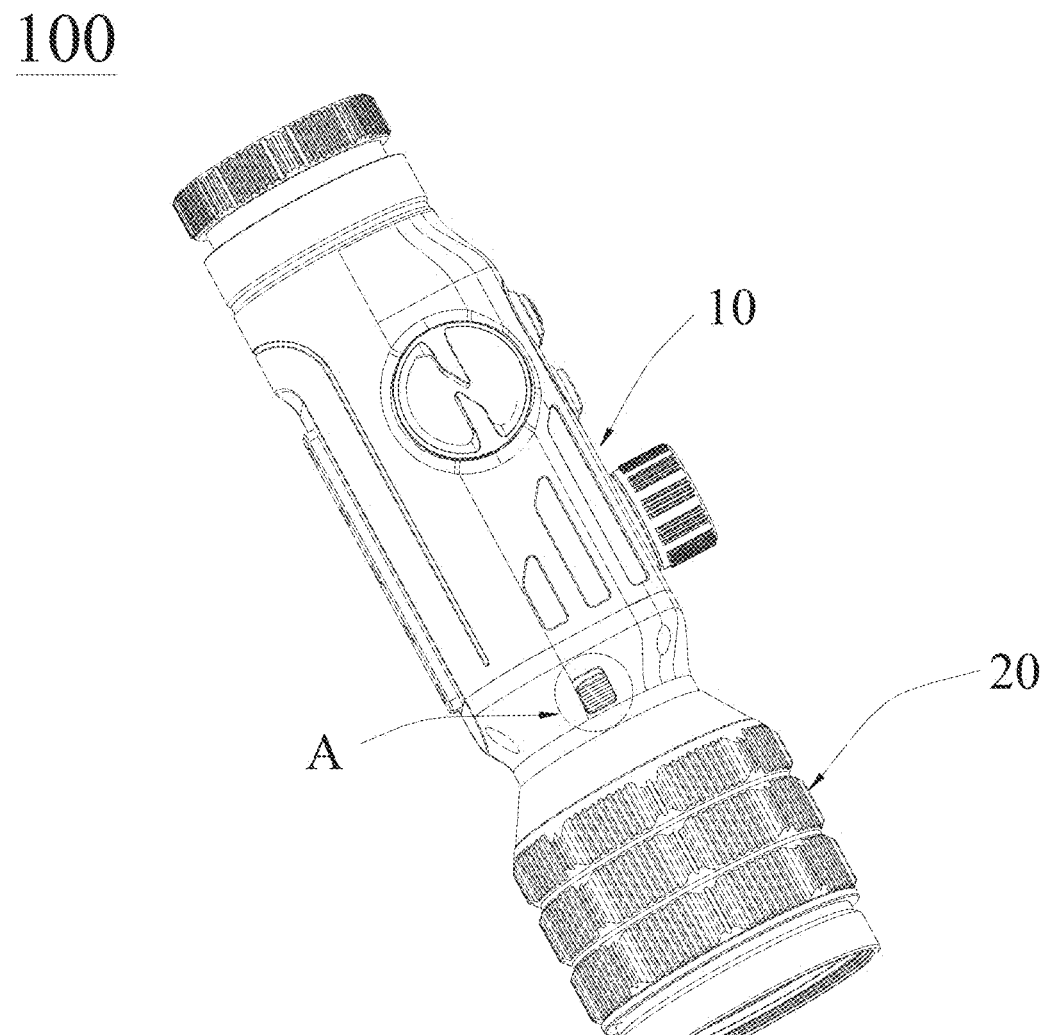
FIG. 1 is a three-dimensional diagram of a digital sight provided according to Embodiment 1 of the present disclosure.
Figure 2:
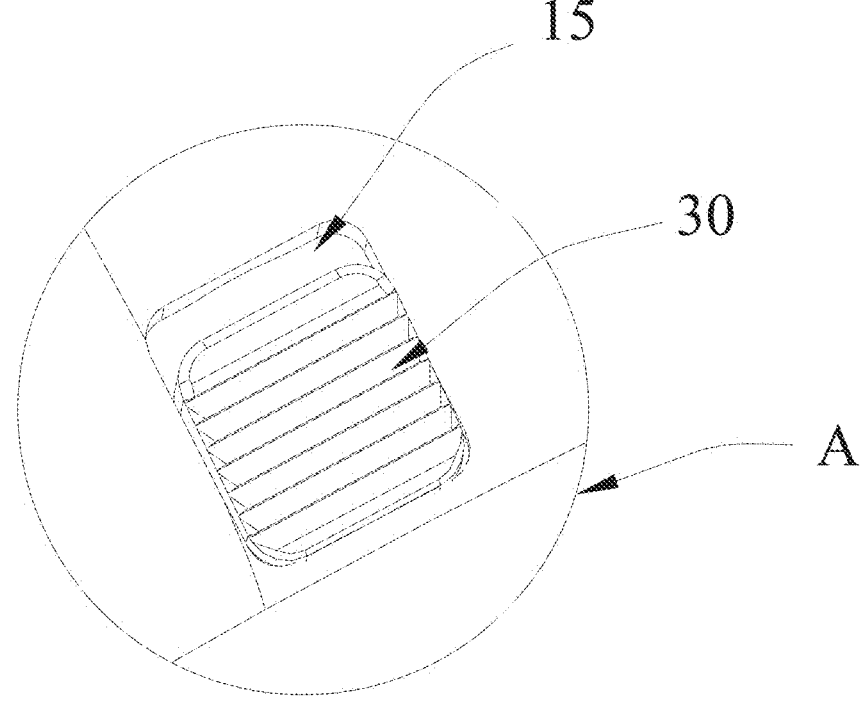
FIG. 2 is an enlarged view of A in FIG. 1 provided according to Embodiment 1 of the present disclosure.
Figure 3:
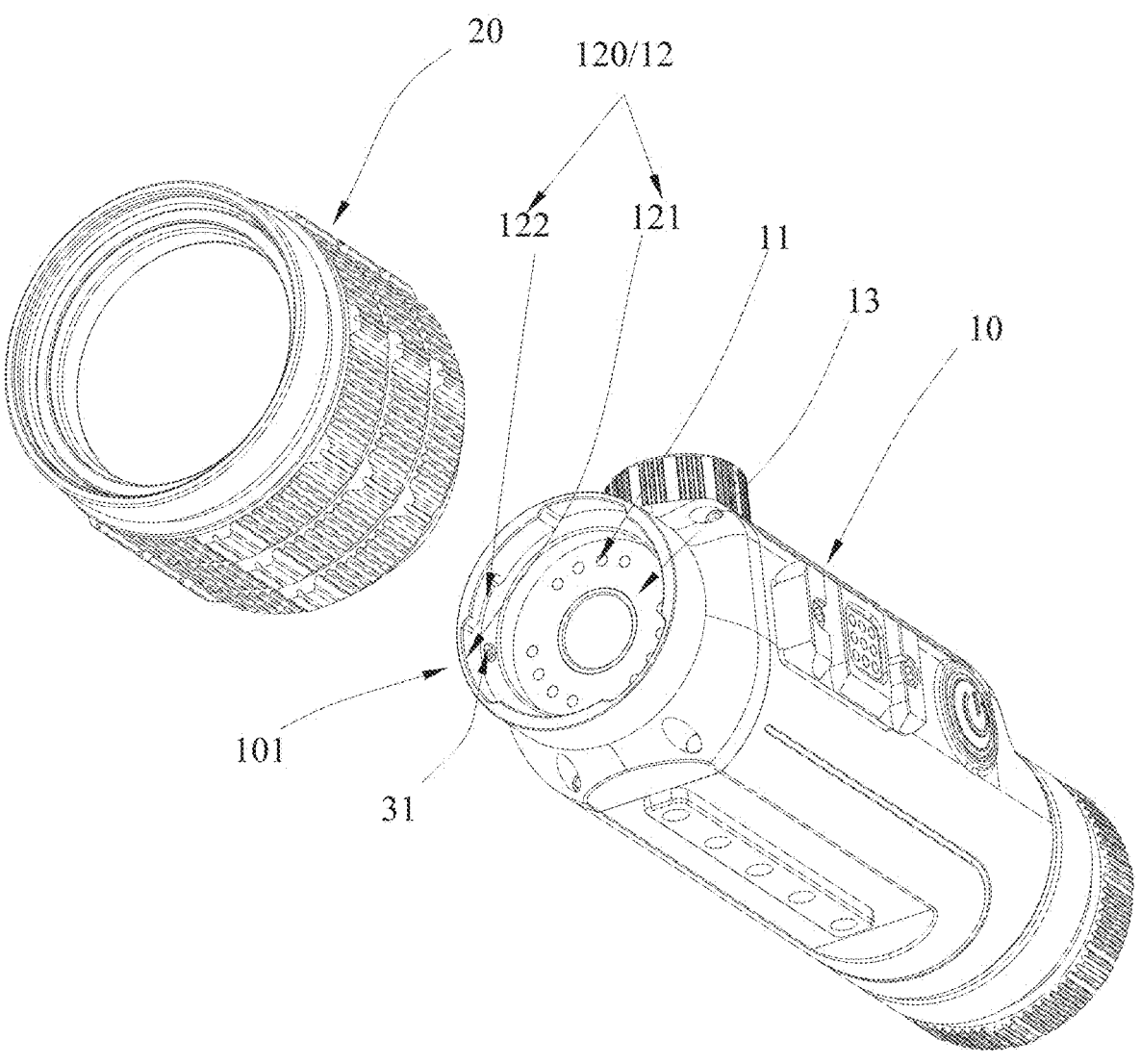
FIG. 3 is an exploded diagram of a digital sight provided according to Embodiment 1 of the present disclosure.
Figure 4:
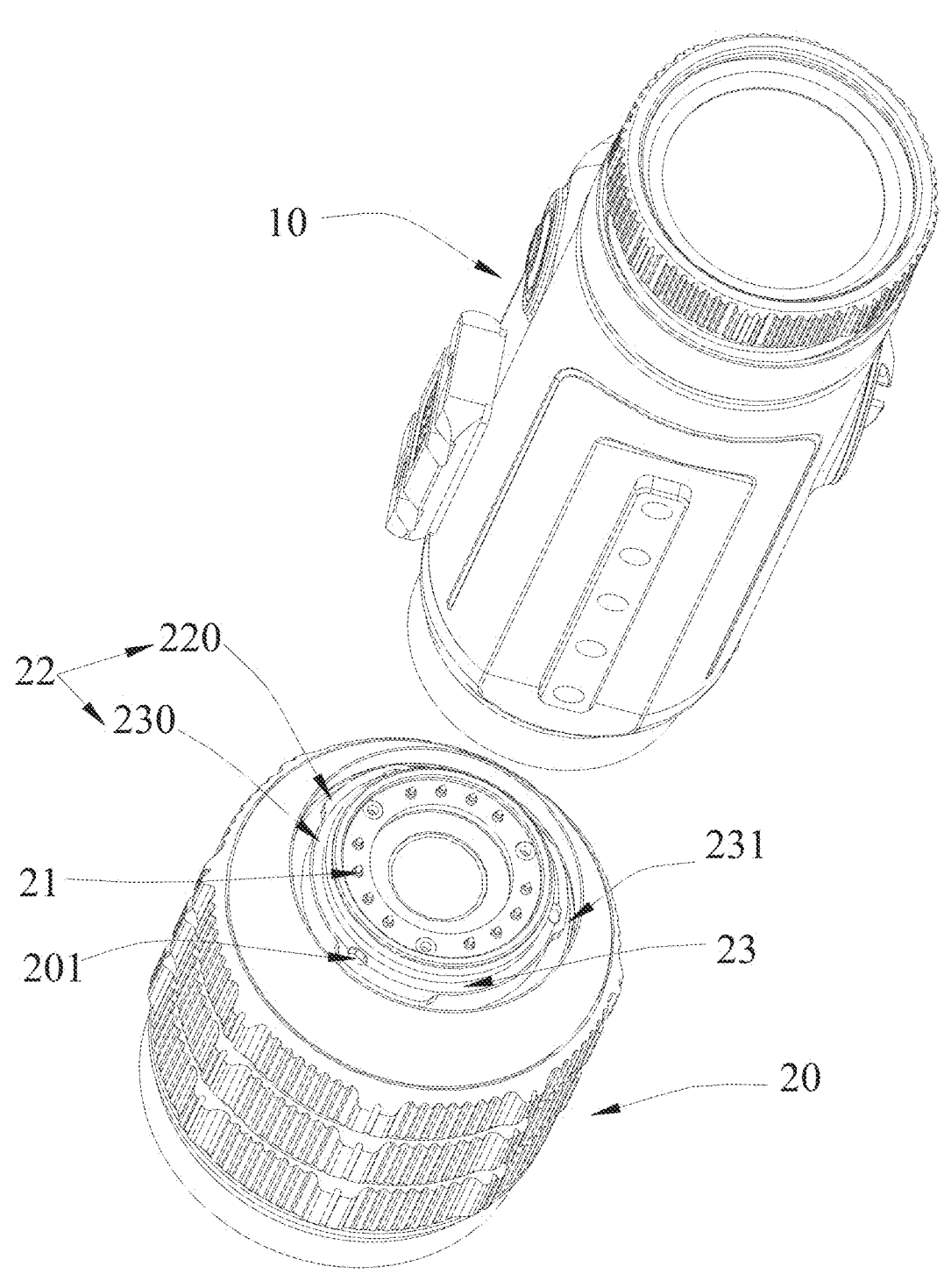
FIG. 4 is an exploded diagram of a digital sight provided according to Embodiment 1 of the present disclosure.
Figure 5:
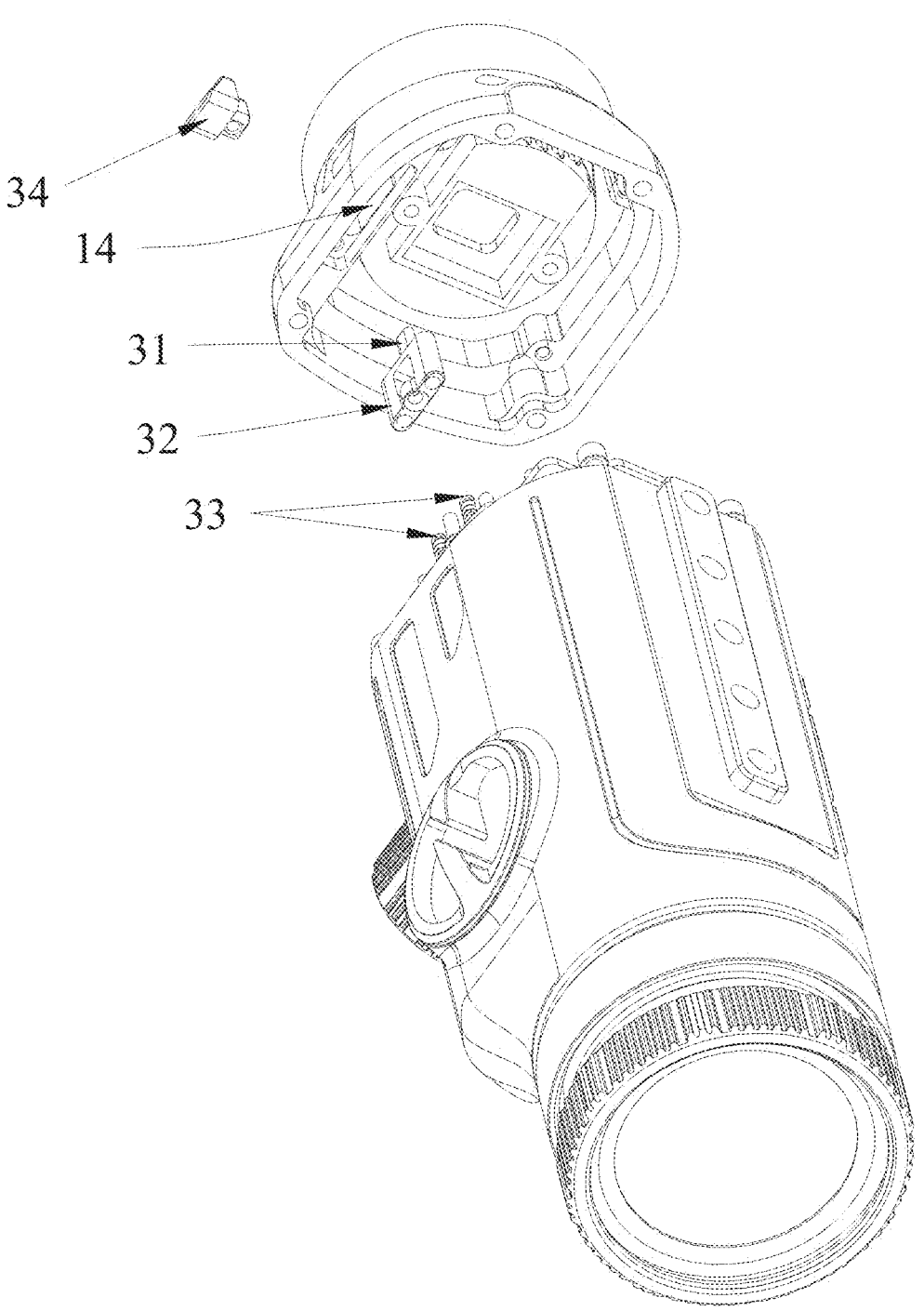
FIG. 5 is a schematic diagram of an exploded structure of a main body of a digital sight provided according to Embodiment 1 of the present disclosure.
Figure 6:
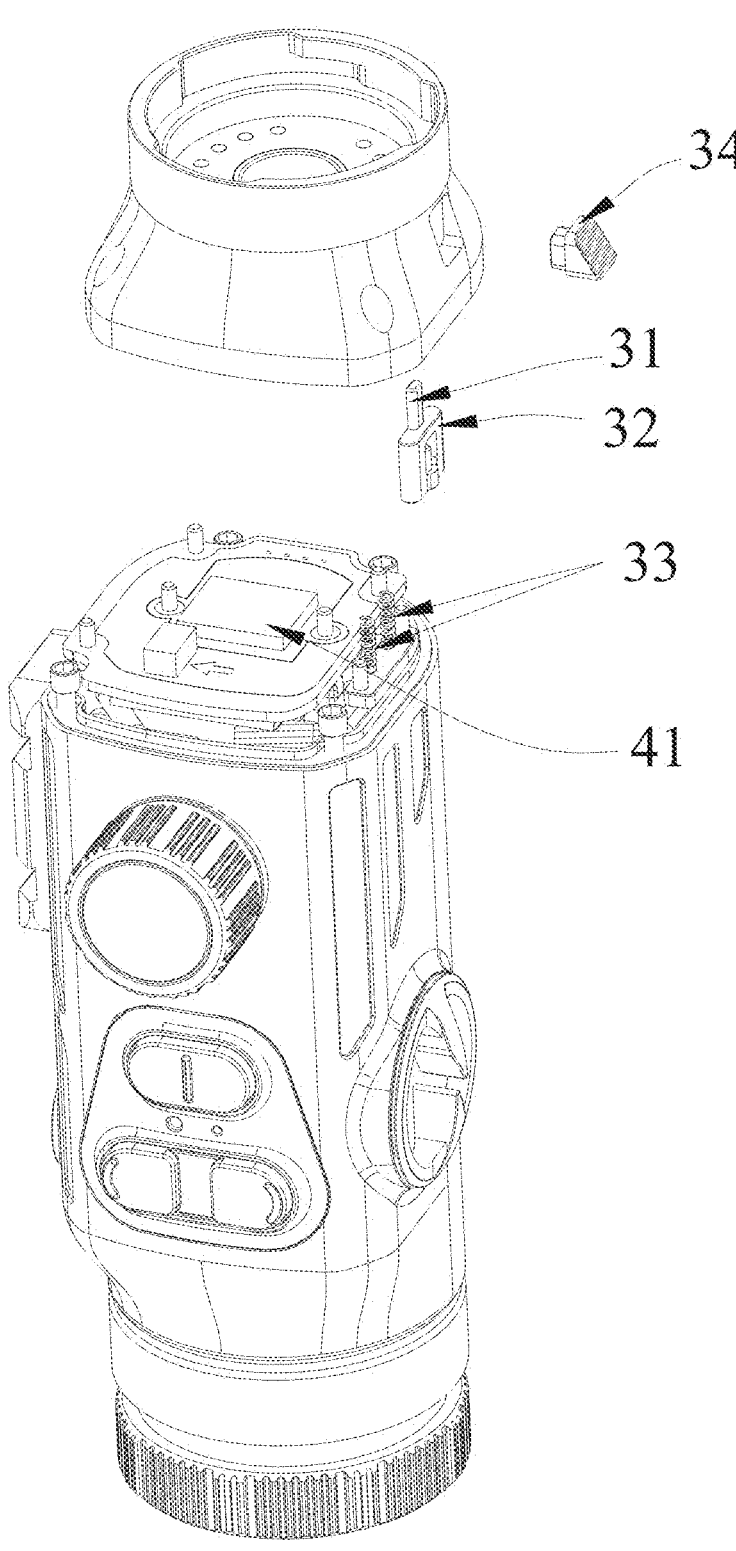
FIG. 6 is an exploded diagram of the main body of FIG. 5 provided according to Embodiment 1 of the present disclosure in another viewing angle.
Figure 7:
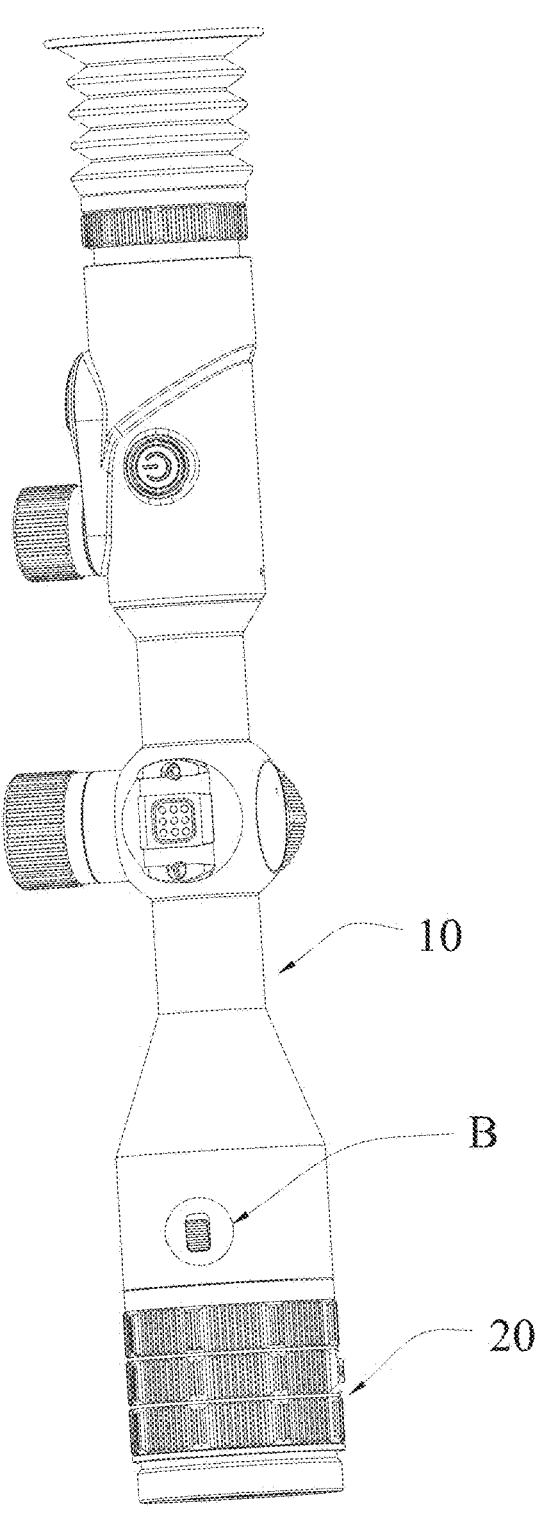
FIG. 7 is a three-dimensional diagram of a night vision sight provided according to Embodiment 1 of the present disclosure.
Figure 8:
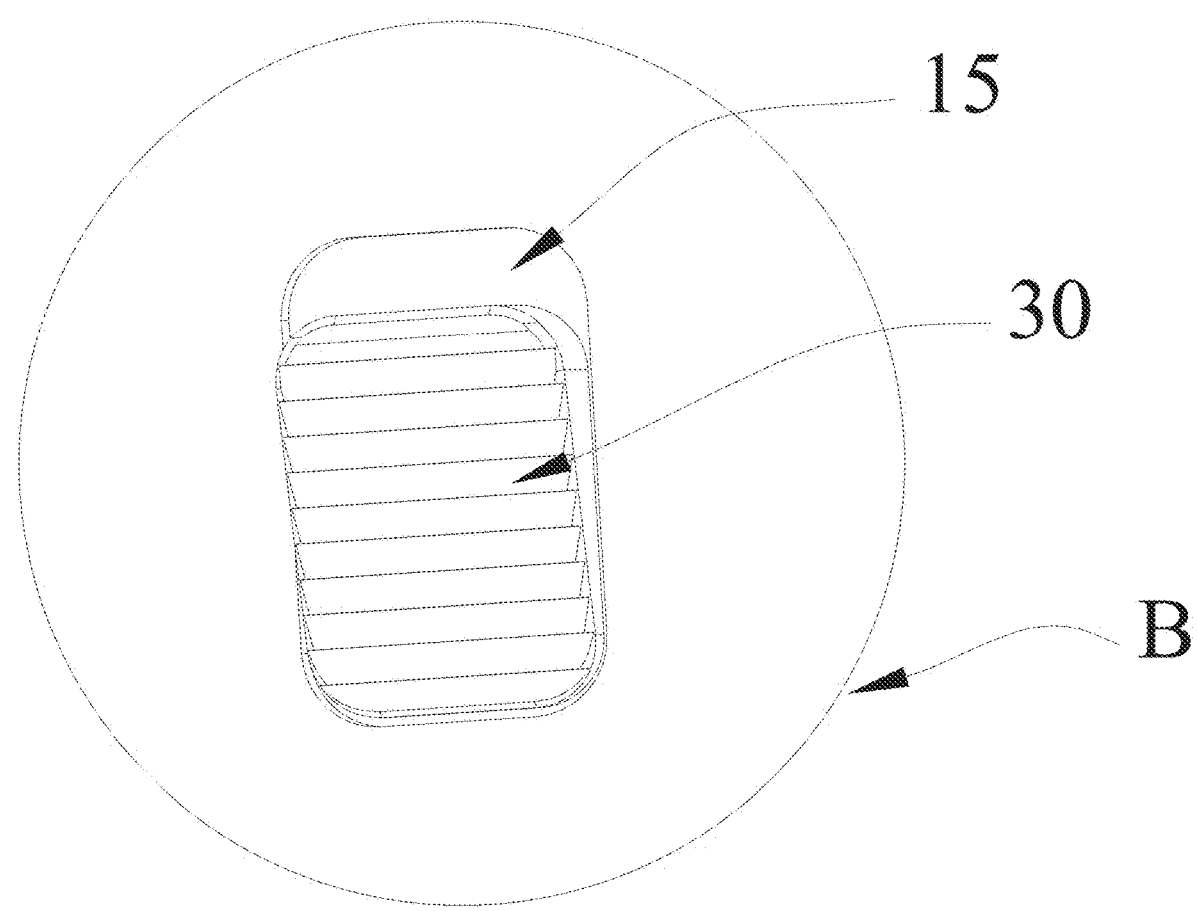
FIG. 8 is an enlarged view of B in FIG. 7 provided according to Embodiment 1 of the present disclosure.
Figure 9:
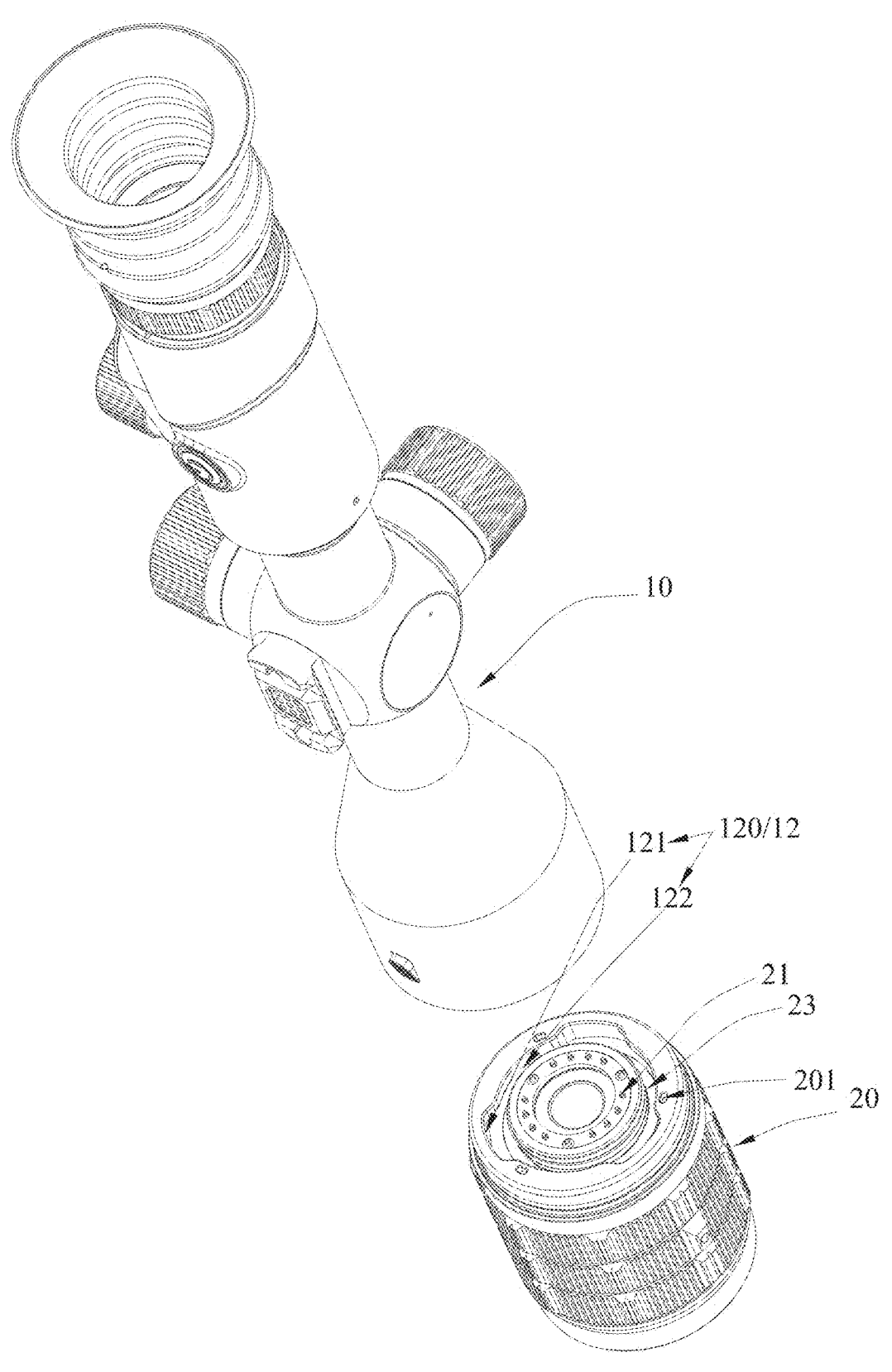
FIG. 9 is an exploded diagram of a night vision sight provided according to Embodiment 1 of the present disclosure.
Figure 10:
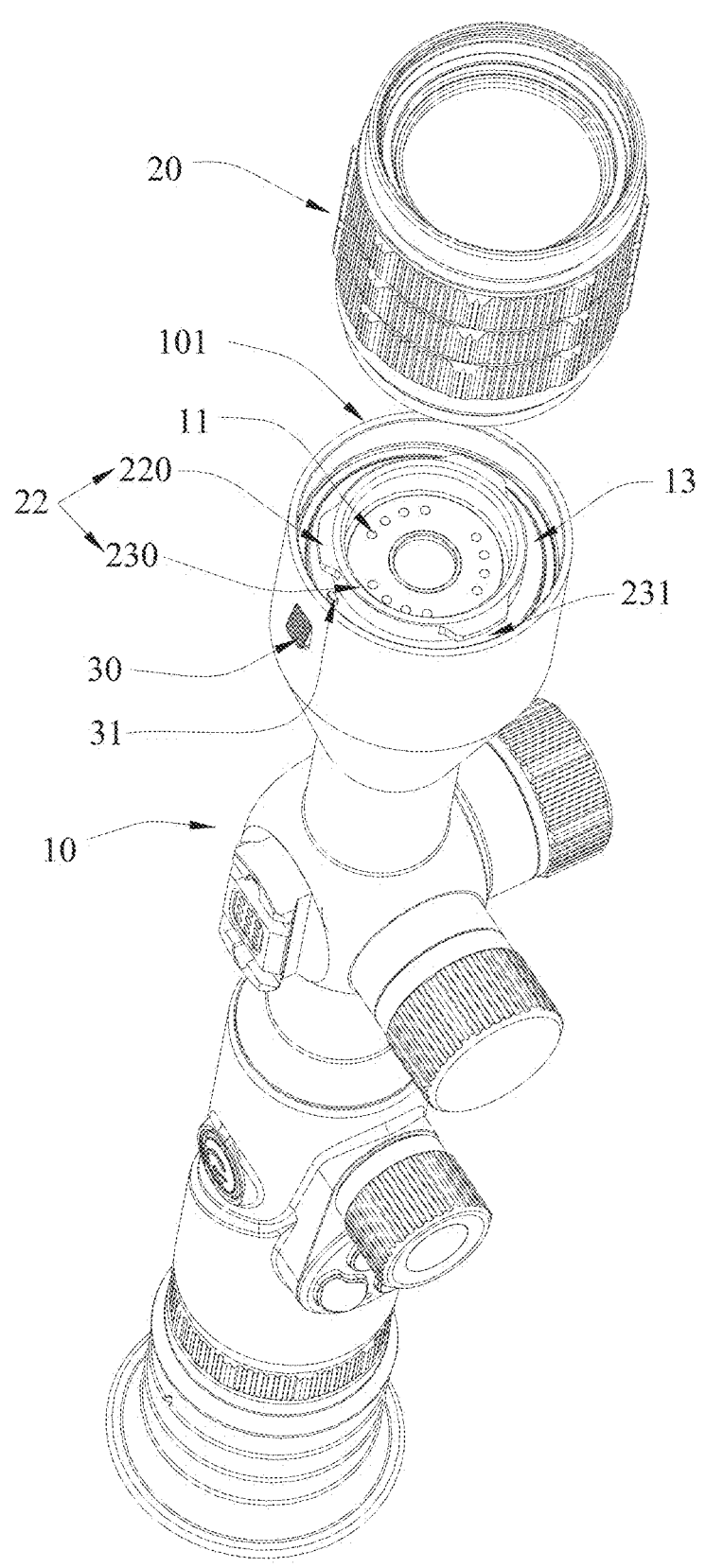
FIG. 10 is an exploded diagram of a night vision sight provided according to Embodiment 1 of the present disclosure.
Figure 11:
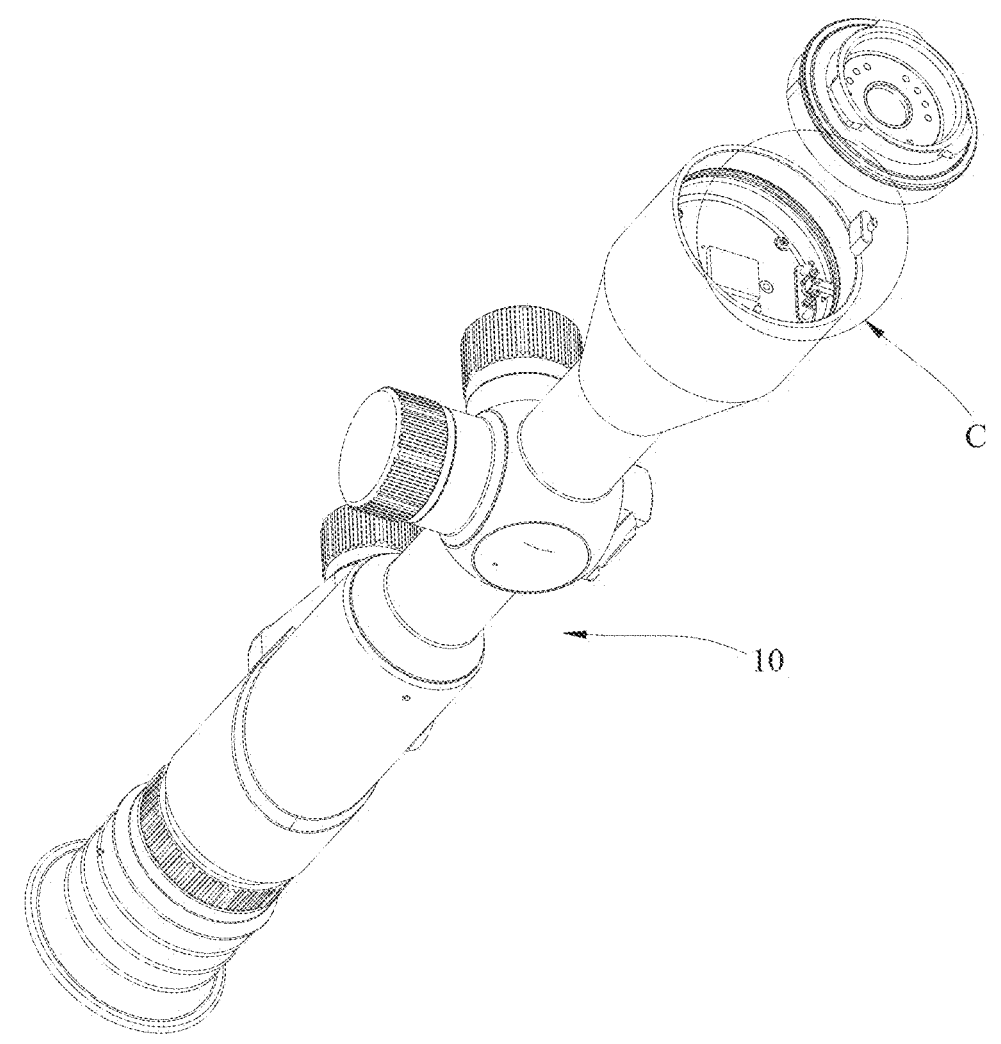
FIG. 11 is a schematic diagram of an exploded structure of a main body of a night vision sight provided according to Embodiment 1 of the present disclosure.
Figure 12:
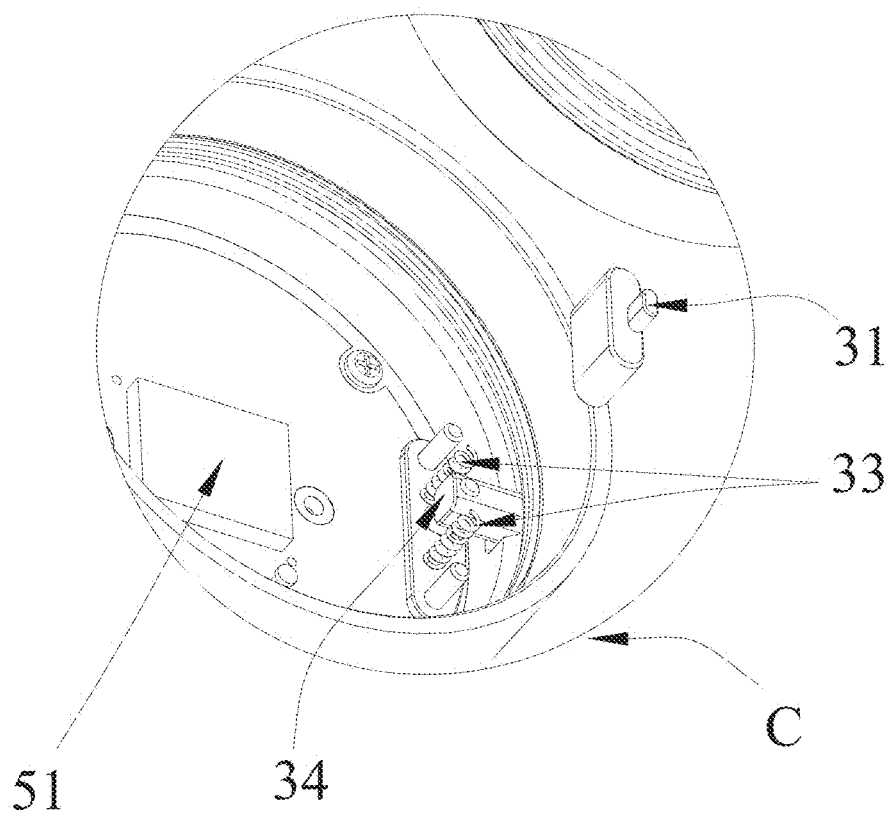
FIG. 12 is an enlarged view of C in FIG. 11 provided according to Embodiment 1 of the present disclosure.
Figure 13:
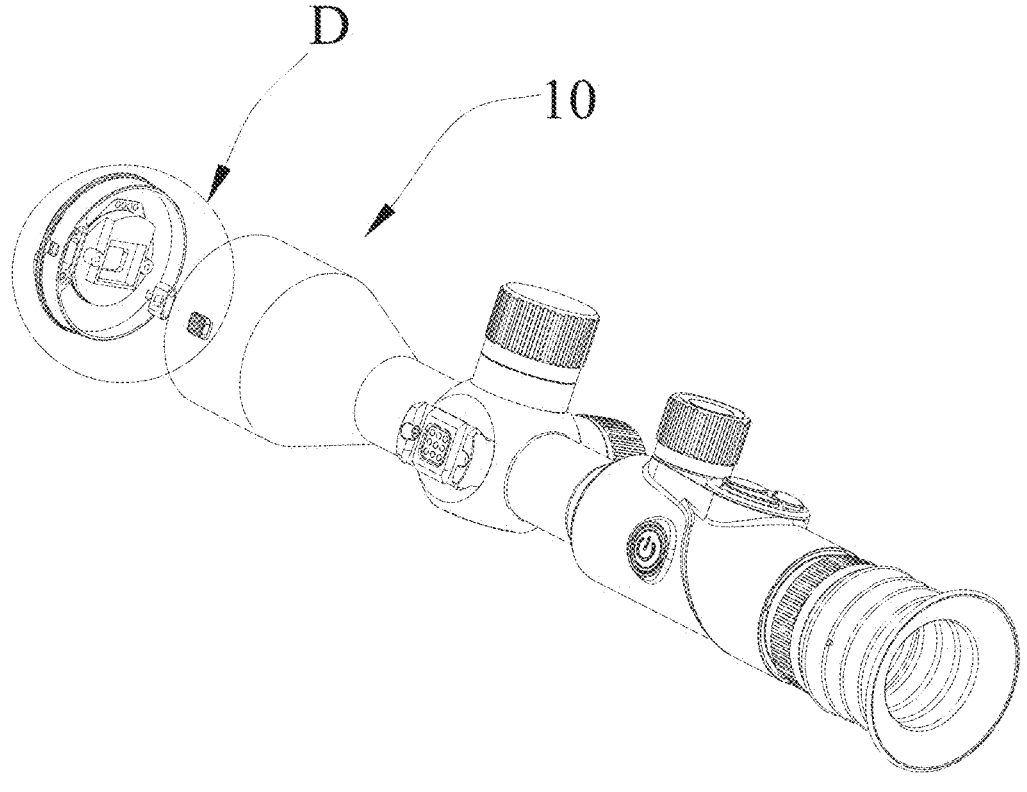
FIG. 13 is an exploded diagram of the main body of FIG. 11 provided according to Embodiment 1 of the present disclosure in another viewing angle.
Figure 14:
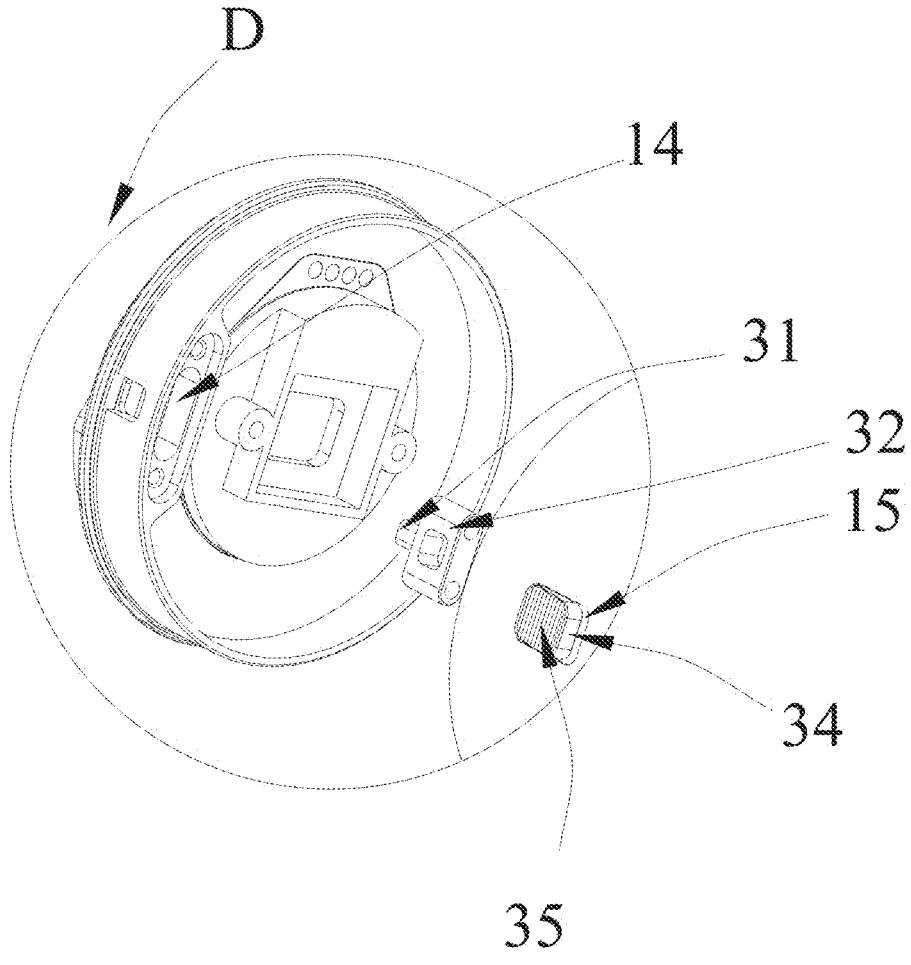
FIG. 14 is an enlarged view of D in FIG. 13 provided according to Embodiment 1 of the present disclosure.
Figure 15:
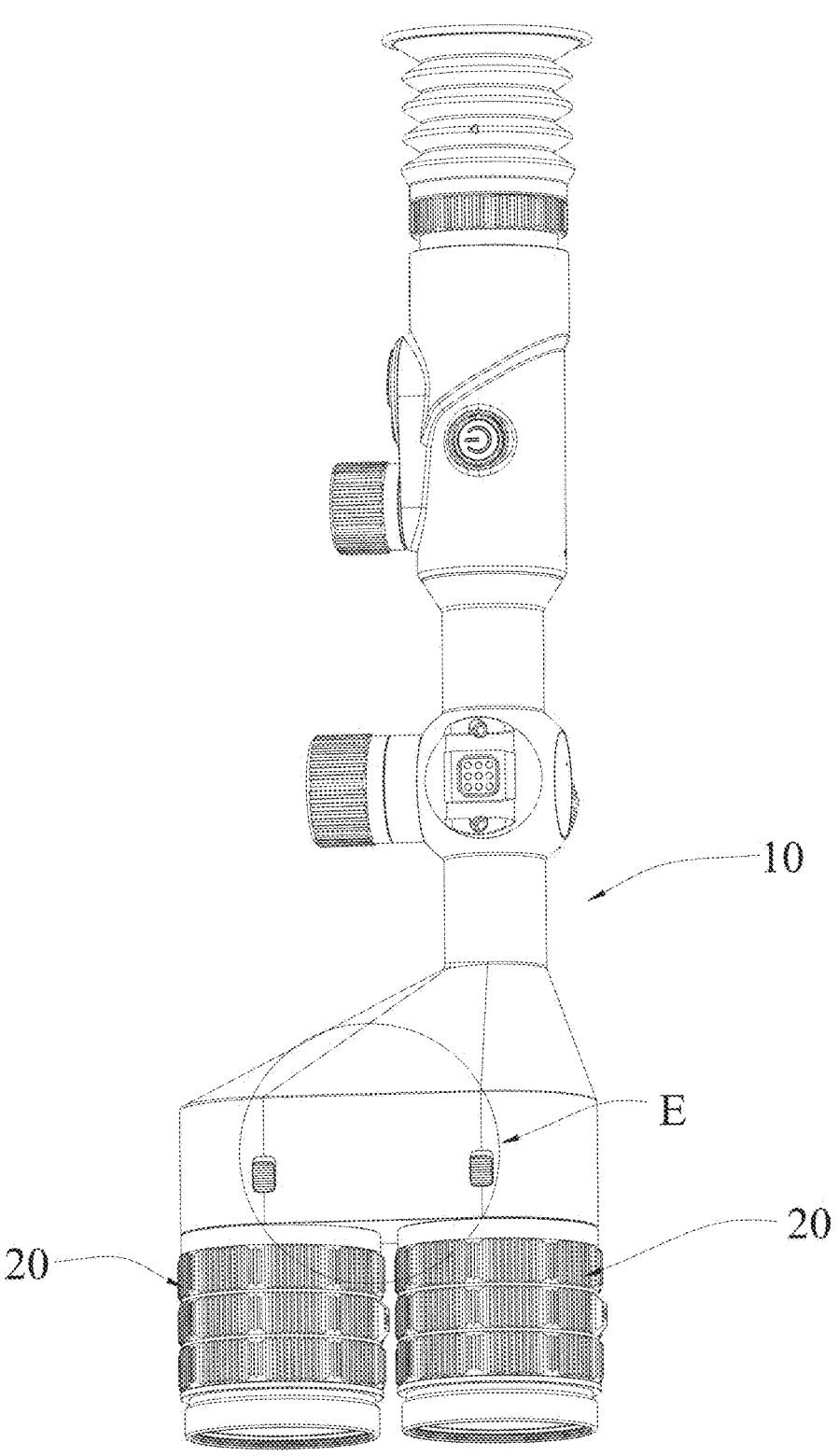
FIG. 15 is a three-dimensional diagram of a dual-lens sight provided according to Embodiment 1 of the present disclosure.
Figure 16:
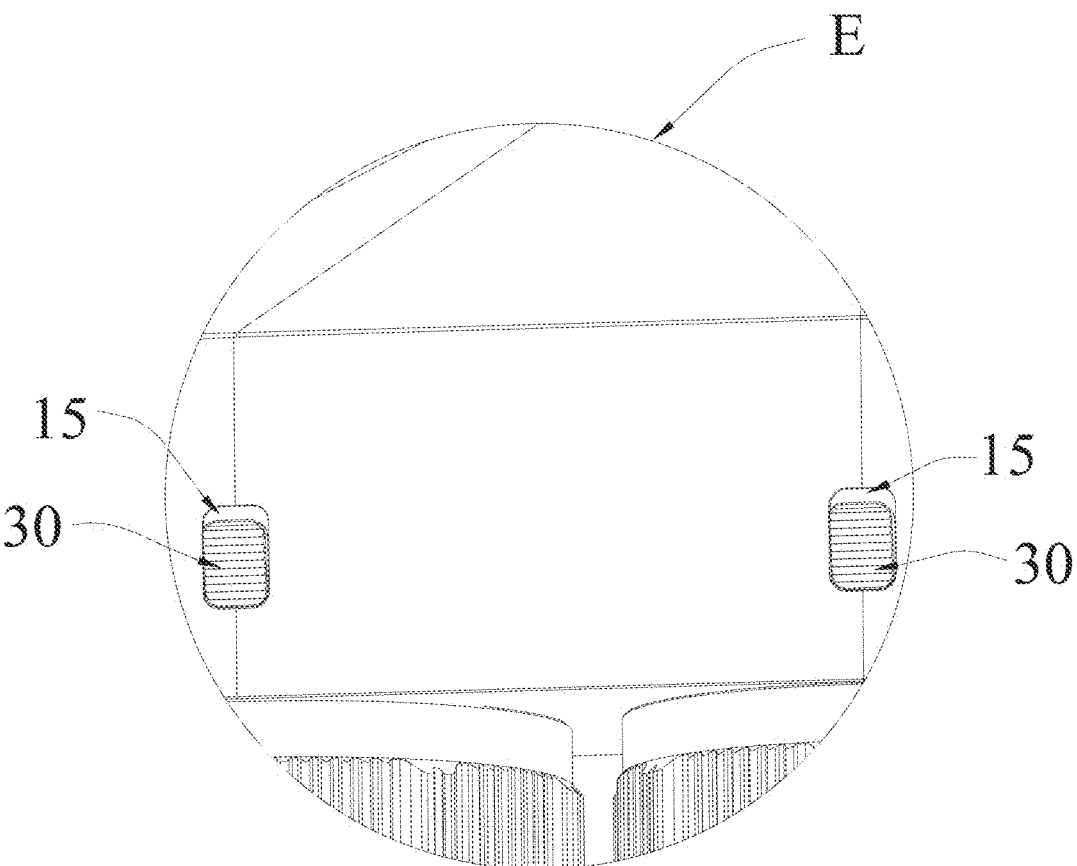
FIG. 16 is an enlarged view of E in FIG. 15 provided according to Embodiment 1 of the present disclosure.
Figure 17:
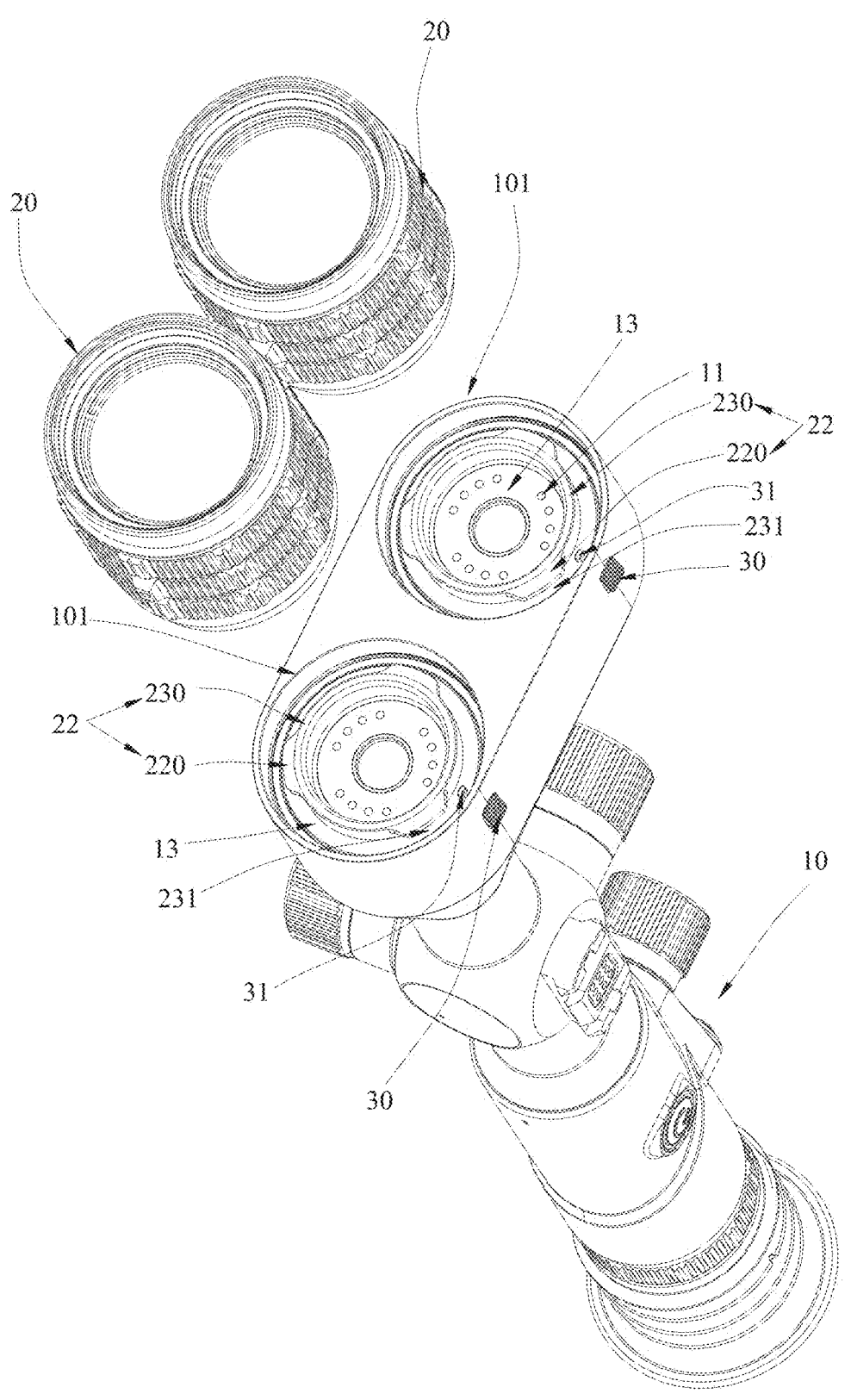
FIG. 17 is an exploded diagram of a dual-lens sight provided according to Embodiment 1 of the present disclosure.
Figure 18:
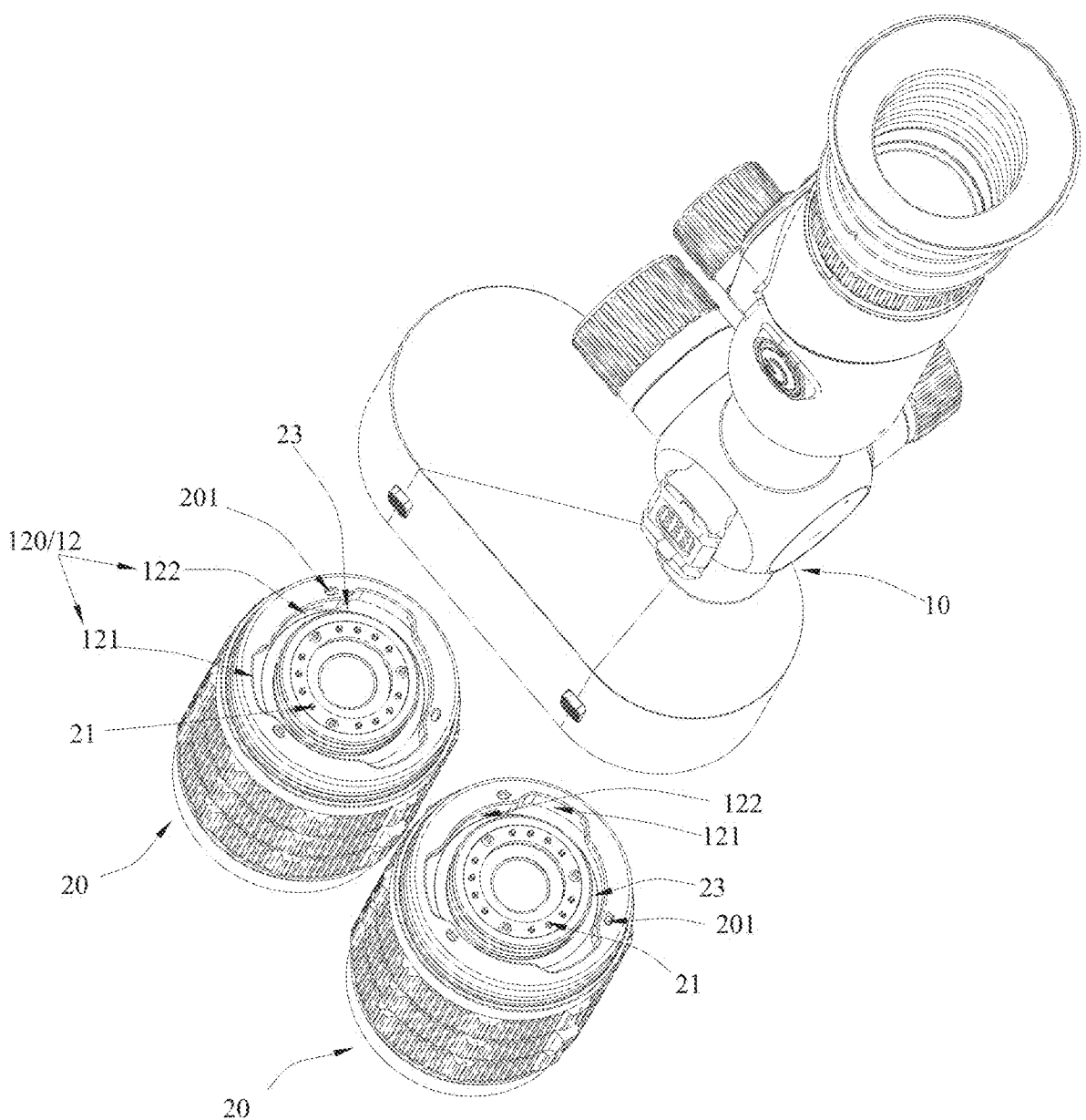
FIG. 18 is an exploded diagram of a dual-lens sight provided according to the Embodiment 1 of present disclosure.
Figure 19:
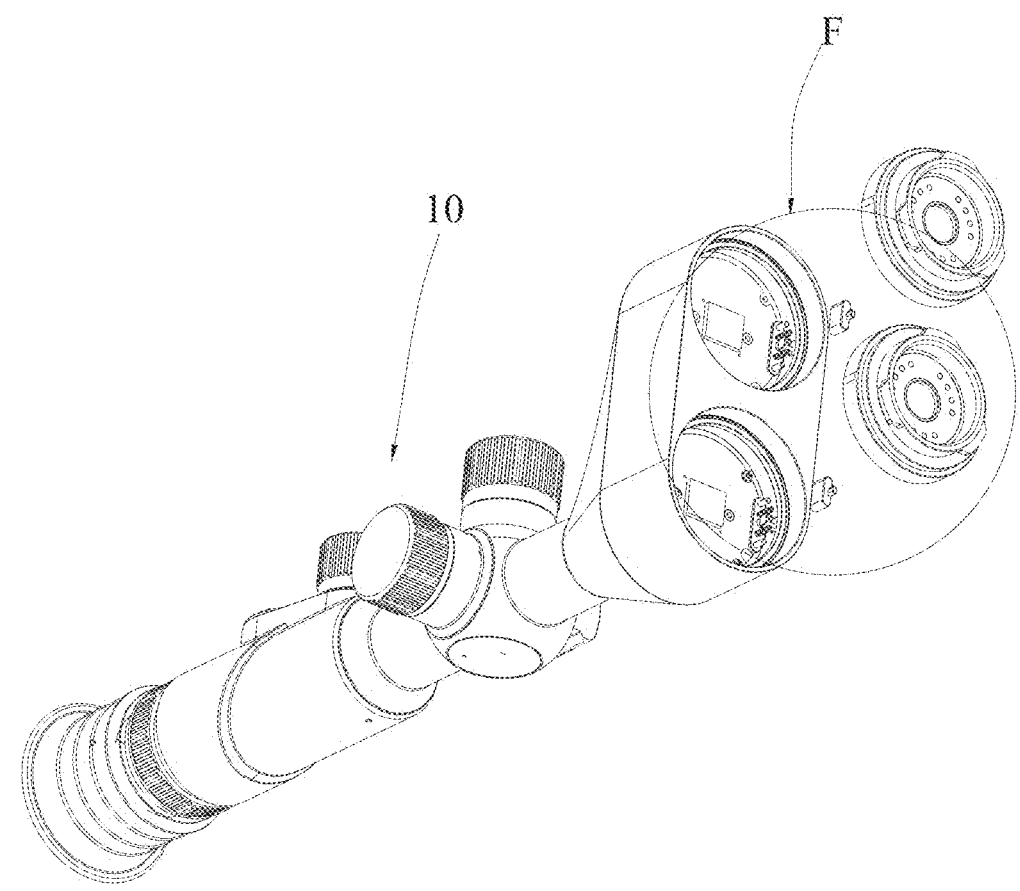
FIG. 19 is a schematic diagram of an exploded structure of a main body of a dual-lens sight provided according to Embodiment 1 of the present disclosure.
Figure 20:
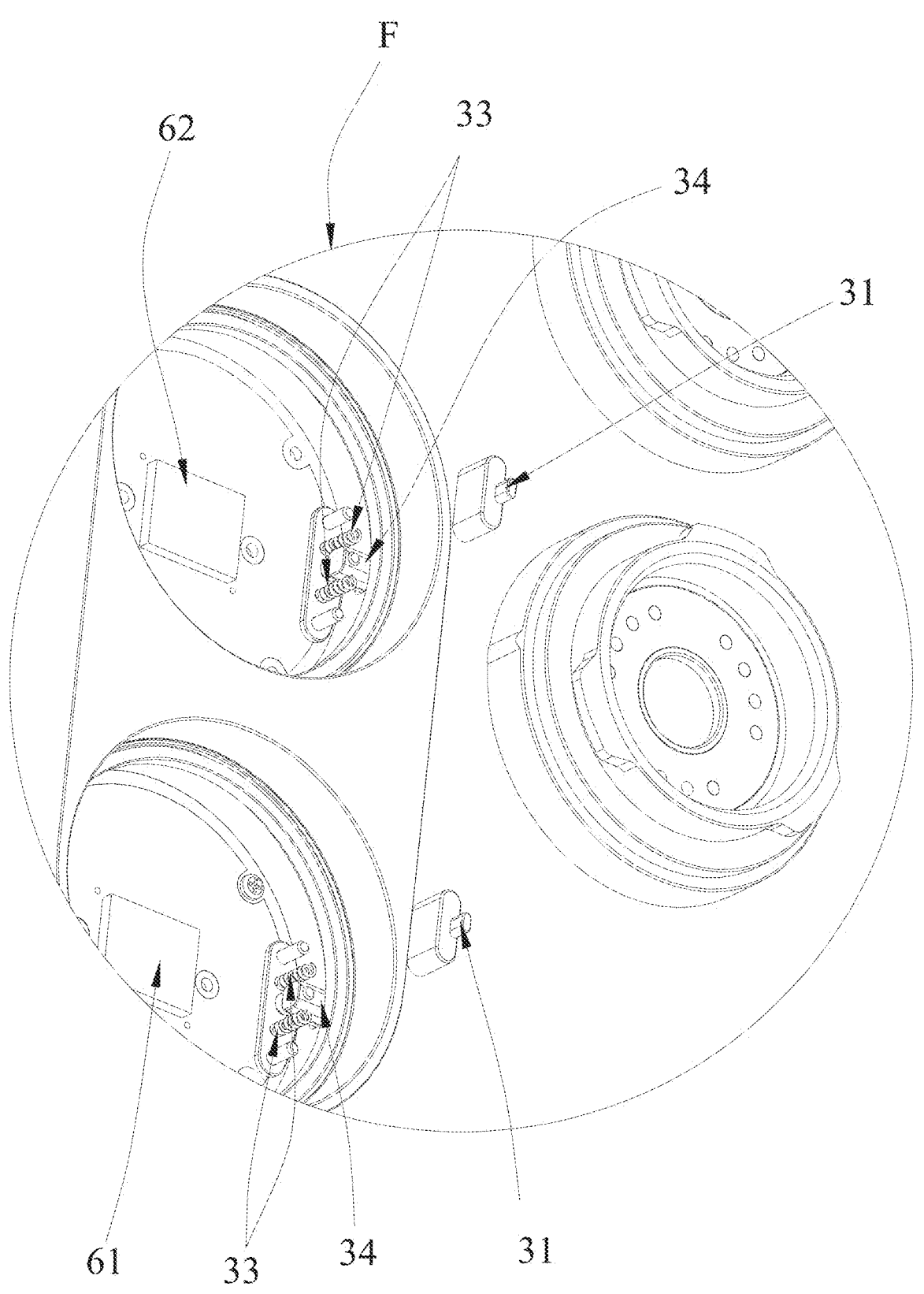
FIG. 20 is an enlarged view of F in FIG. 19 provided according to Embodiment 1 of the present disclosure.
Figure 21:
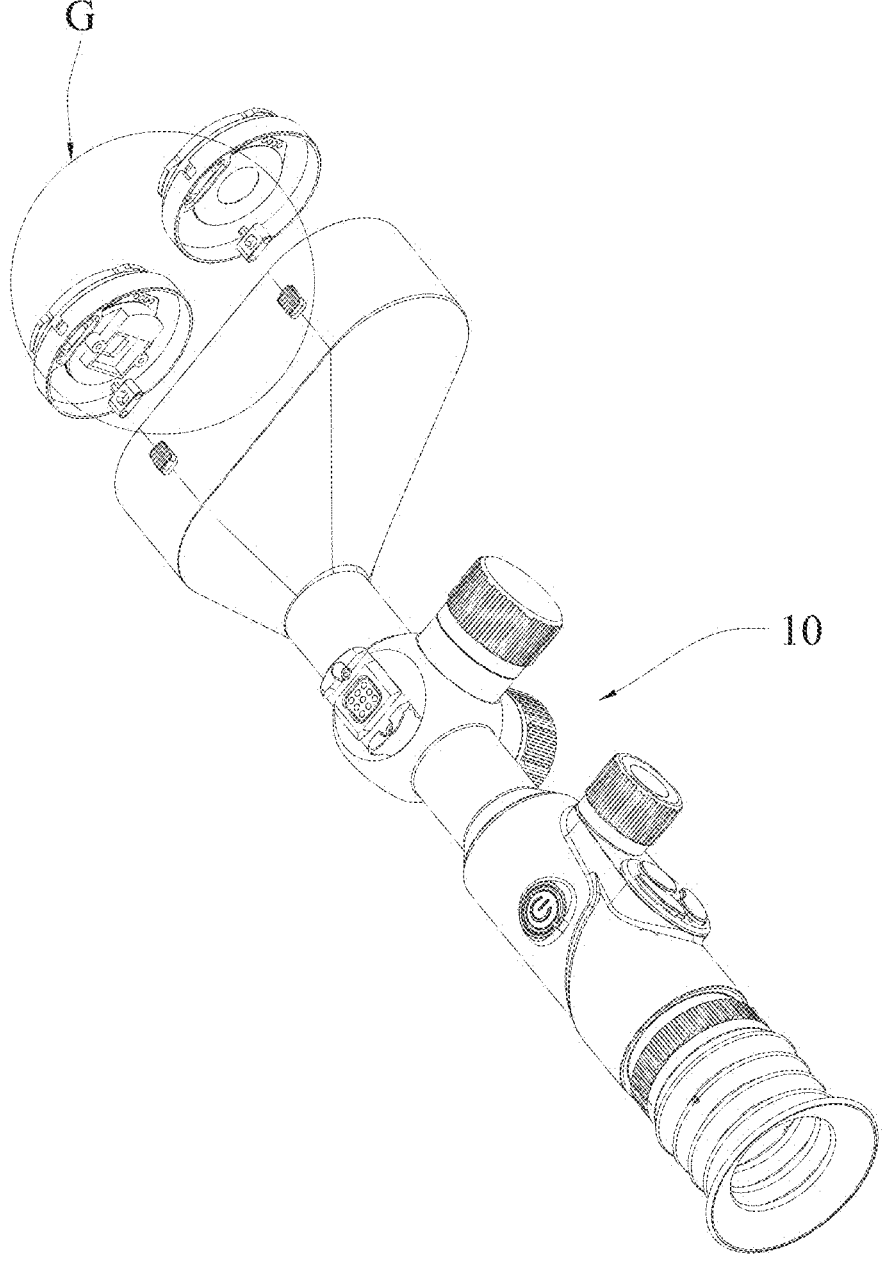
FIG. 21 is an exploded diagram of the main body of the dual-lens sight provided according to Embodiment 1 of the present disclosure in another viewing angle.
Figure 22:
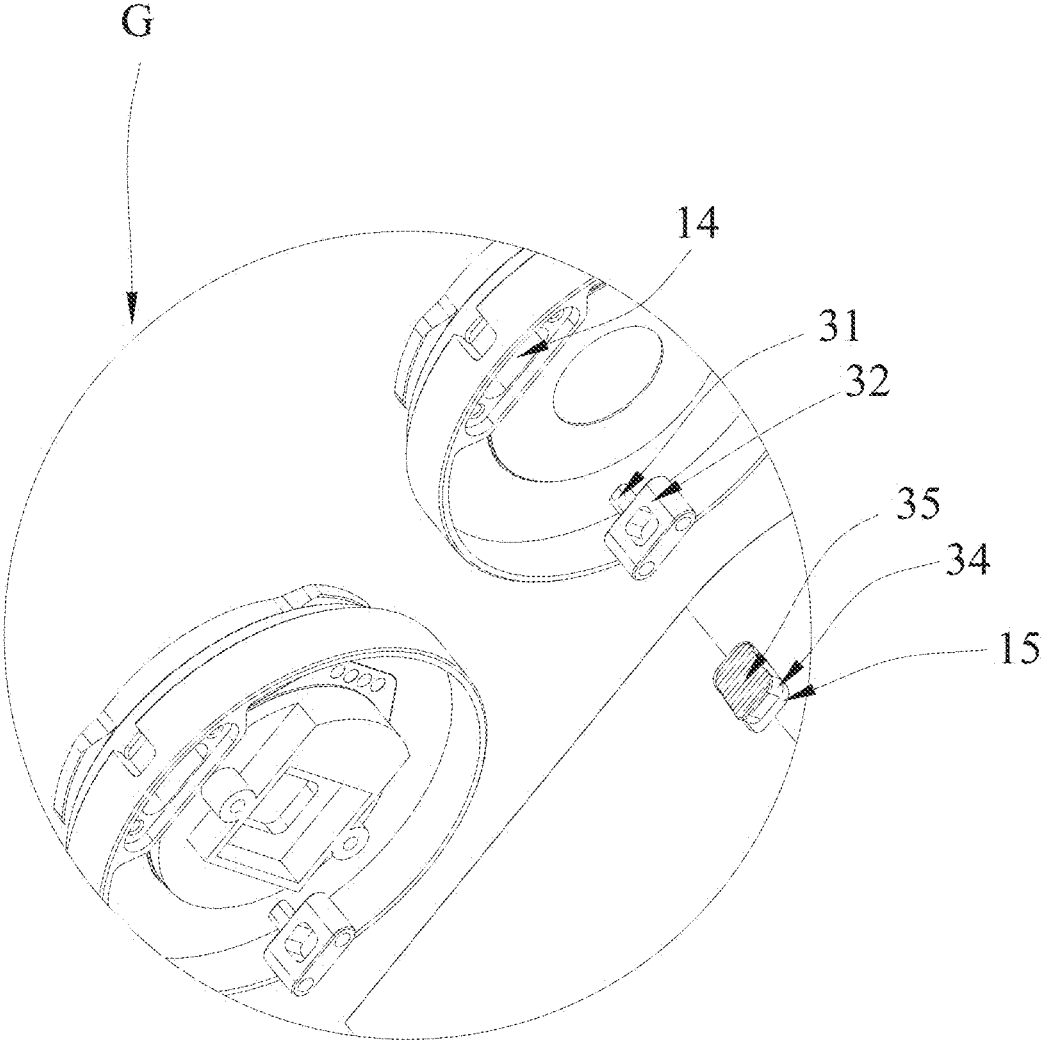
FIG. 22 is an enlarged view of G in FIG. 21 provided according to Embodiment 1 of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Embodiment 1

Referring to FIG. 1 to FIG. 22, the present disclosure provides a sight. The sight includes a main body 10 and an objective lens piece 20.

The main body 10 includes a connection end 101; a first electric connection assembly 11 is arranged on an end surface of the connection end 101 of the main body 10; and a first connection member 12 is arranged around the first electric connection assembly 11.

A second electric connection assembly 21 is arranged on one end surface of the objective lens piece 20; a second connection member 22 is arranged around the second electric connection assembly 21; the second connection member 22 can be clamped into the first connection member 12 to make the objective lens piece 20 detachably connected to the main body 10; and when the second connection member 22 is clamped into the first connection member 12, the second electric connection assembly 21 is abutted to the first electric connection assembly 11 to make the objective lens piece 20 electrically connected to the main body 10. That is, the objective lens piece of the sight is separably connected to the main body of the sight through the first connection member and the second connection member. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

The sight in this embodiment can be a digital sight 100, a night vision sight 200, and a dual-lens sight 300. The main bodies and objective lenses of the three types of sights are detachably connected through the first electric connection assembly and the second electric connection assembly, and are electrically connected through the first electric connection assembly and the second electric connection assembly. It should be noted that the lenses of the digital sight 100, the night vision sight 200, and the dual-lens sight 300 are not interchangeable, but different sights have their own objective lenses, because materials and design structures of the objective lenses of these sights are different. Therefore, the objective lenses cannot be interchangeable.

FIG. 1 to FIG. 6 show schematic detachably structural diagrams between the objective lens and the main body of the digital sight 100. The digital sight 100 further includes a liquid crystal display device and a Complementary Metal-Oxide-Semiconductor Transistor (CMOS) image sensing device 41. The liquid crystal display device and the CMOS image sensing device 41 are arranged in the main body, and the liquid crystal display device is electrically connected to the CMOS image sensing device 41. The liquid crystal display device is not shown in the figure, but a liquid crystal display technology is the prior art, which will not be elaborated here.

The above night vision sight 200 includes a low light level sight, an active infrared sight, and a thermal imaging sight. A first night vision device 51 is arranged in the main body of each of the three types of sights. However, the first night vision devices 51 have different structures depending on different presentation effects. The low light level sight does not use infrared rays, but enhances light emitted by a target under weak light onto a screen for imaging through an enhancer. People can see this image with the naked eye. That is, the low light level sight adopts a second-generation microchannel plate image enhancer, which can improve the imaging quality, expand the spectral bandwidth, and reduce the mass. The active infrared sight illuminates a target using infrared rays, and the infrared rays are reflected by the target for imaging. The thermal imaging sight is used for performing thermal imaging on the sight. The night vision sight 200 in this embodiment is a thermal imaging sight structurally shown in FIG. 7 to FIG. 14. The other two types are not shown here, the detachable structures of which between objective lenses and the main bodies are consistent with the detachable structure shown in FIG. 7 to FIG. 14.

FIG. 15 to FIG. 22 show diagrams of the above dual-lens sight 300. The main body 10 of the dual-lens sight 300 includes two connection ends 101. The two connection ends 101 are arranged side by side. The dual-lens sight 300 further includes a vanadium oxide detector device 61 and a second night vision device 62. The second night vision device 62 is arranged in one connection end 101, and the vanadium oxide detector device 61 is arranged in the other connection end 101. That is, the dual-lens sight 300 can be provided with two objective lens pieces. The two objective lens pieces can be detachably connected to the main body. One lens piece of the dual-lens sight is for night vision displaying, and the other lens piece is for thermal imaging displaying, so as to meet a need of a user for using two lenses.

In this embodiment, the end surface of the connection end of the main body 10 is provided with a first groove 13; the first electric connection assembly 11 and the first connection member 12 are both arranged in the first groove 13; an end surface of one end of the objective lens piece 20 connected to the main body 10 is provided with a second groove 23; the second connection member 22 and the second electric connection assembly 21 are both arranged in the second groove 23; and when the objective lens piece 20 is mounted on the main body 10, the second groove 23 wraps around the first groove 13 or the first groove 13 wraps around the second groove 23. The objective lens piece 20 and the main body 10 are both provided with the grooves, so that the objective lens piece and the main body are connected more tightly, and the stability of mounting of the objective lens piece is higher. When the user shakes at any time, it is not easy for the objective lens piece to be separated from the main body; and the objective lens piece is protected, which avoids loss of the user.

In this embodiment, the first connection member 12 includes a clamping port 120; the clamping port 120 is arranged on a side wall of the first groove 13; the second connection member 22 includes a first clamping block 220 and a mounting column 230; two ends of the mounting column 230 are communicated to each other; the mounting column 230 is arranged in the second groove 23; the second electric connection assembly 21 is arranged in a through hole of the mounting column 230; the first clamping block 220 is arranged around an outer side of the mounting column 230; a gap 231 exists between an end socket of the first clamping block 220 and a side wall of the second groove 23;

the gap 231 can accommodate the side wall of the first groove 13; and when the objective lens piece 20 is mounted on the main body 10, the side wall of the first groove 13 is mounted in the gap 231, and the second groove 23 wraps around the first groove 13. Or the first connection member 12 includes a first clamping block 220 and a mounting column 230; two ends of the mounting column 230 are communicated to each other; the mounting column 230 is arranged in the first groove 13; the first clamping block 220 is arranged around an outer side of the mounting column 230; a gap 231 exists between an end socket of the first clamping block 220 and the side wall of the first groove 13; the gap 231 can accommodate a side wall of the second groove 23; and when the objective lens piece 20 is mounted on the main body 10, the side wall of the second groove 23 is mounted in the gap 231, and the first groove 13 wraps around the second groove 23. The above structure further improves the stability of mounting of the objective lens piece.

In this embodiment, the clamping port 120 includes an insertion opening 121 and a sliding rail 122; the insertion opening 121 is communicated to the sliding rail 122; the first clamping block 220 is inserted along the insertion opening 121 into the sliding rail 122 and can slide in the sliding rail 122; and the first clamping block 220 is abutted to a side wall of the sliding rail 122. By means of the arrangement of the above structure, during mounting of the objective lens piece, the first clamping block is inserted along the insertion opening into the sliding rail, and the objective lens piece is rotated to make the first clamping block slide in the sliding rail. In this case, the first clamping block is abutted to the inner wall of the sliding rail to prevent the objective lens piece from falling off. This facilitates the mounting by the user.

In this embodiment, the sight further includes a locking member 30; the locking member 30 is slidably arranged on the main body 10; one end of the locking member 30 is located in the first groove 13; the second groove 23 is internally provided with a locking hole 201; the locking member 30 has a locked position and an unlocked position; when the locking member 30 is in the locked position, the end of the locking member 30 located in the first groove 13 is inserted into the locking hole 201; and when the locking member 30 is in the unlocked position, the end of the locking member 30 located in the first groove 13 is separated from the locking hole 201. The objective lens piece is rotated to a mounting position. In this case, the locking member faces the locking hole and is inserted into the locking hole to further fix the objective lens piece, so as to prevent the objective lens piece from being rotated relative to the main body and improve the stability of the product. During removal of the objective lens piece, the locking member is pressed to be separated from the locking hole; the objective lens piece is rotated to make the first clamping block face the insertion opening; the first clamping block is pulled out along the insertion opening to facilitate the user to remove and replace the objective lens piece, improve the adaptability of the product, and also facilitate the user to maintain and clean the objective lens piece.

In this embodiment, the objective lens piece 20 has an insertion position and a mounting position. When the objective lens piece 20 is in the insertion position, the first clamping block 220 can be inserted in or pulled out along the insertion opening. When the objective lens piece 20 is rotated to the mounting position, the first clamping block 220 is abutted to the side wall of the sliding rail; and when the locking member 30 is in the locked position, the locking member 30 is inserted into the locking hole 201. By means of the arrangement of the above structure, the objective lens piece can be rotated relative to the main body. When the objective lens piece is rotated to the insertion position, the first clamping block 220 faces the insertion opening and can be inserted in or pulled out along the insertion opening. The objective lens piece is rotated. In this case, the first clamping block 220 slides in the sliding rail and is abutted to the inner wall of the sliding rail. The objective lens piece is rotated to the mounting position, and the locking member is inserted into the locking hole to limit the relative rotation between the objective lens piece and the main body, making it convenient to use. There may be a plurality of first clamping blocks 220 which are uniformly arranged in the groove. Correspondingly, there should also be a plurality of insertion openings. The number and relative positions of the insertion openings correspond to the number and relative positions of the first clamping blocks 220. Preferably, there may be three first clamping blocks 220. The three first clamping blocks 220 are uniformly arranged in the first groove or the second groove. Correspondingly, there are also three insertion openings. The positions of the insertion openings correspond to the positions of the first clamping blocks 220. During use, in rotation, the three first clamping blocks 220 respectively correspond to the three insertion openings, which reduces the rotation stroke of the objective lens piece rotated by the user. This can facilitate the user to align the first clamping blocks 220 with the insertion openings. The first clamping blocks 220 can correspond to the insertion openings in a plurality of positions, making it convenient for the user to assemble the objective lens piece. Meanwhile, there are three locking holes correspondingly, so that the objective lens piece can be locked no matter the three first clamping blocks 220 correspond to which insertion openings, and the objective lens piece is prevented from being rotated.

In this embodiment, the locking member 30 includes an insertion part 31, a sliding part 32, and a first elastic member 33; a sliding space 14 is arranged in the main body 10; the sliding part 32 slides in the sliding space 14; the insertion part 31 is arranged at one end of the sliding part 32 and is located in the first groove 13; the first elastic member 33 is abutted to an opposite end of the sliding part 32; and when the objective lens piece 20 is rotated to the mounting position, the first elastic member 33 pushes the sliding part 32 to insert the insertion part 31 into the locking hole 201. By means of the arrangement of the above structure, during use, when the objective lens piece is rotated to the insertion position, the first clamping block 220 is inserted along the insertion opening. In this case, a bottom wall of the objective lens piece is abutted to the insertion part, and the first elastic member 33 is compressed to deform. The objective lens piece is rotated to the mounting position. In this case, the locking hole faces the insertion part, and the first elastic member 33 is reset to push the sliding part and the insertion part. The insertion part is inserted into the locking hole to effectively limit the relative rotation between the objective lens piece and the main body 10. Through the deformation and resetting of the first elastic member 33, the objective lens piece can be conveniently mounted, and the user does not need to manually adjust the locking member during the mounting of the objective lens piece, making it convenient to use.

In this embodiment, a surface of the main body 10 is provided with a sliding slot 15; the sliding slot 15 is communicated to the sliding space 14; a surface of the sliding part 32 is convexly provided with a push part 34; and the push part 34 is threaded out of the sliding slot 15. By means of the arrangement of the above structure, during use, the push part is threaded out of the sliding slot, so that the user can directly touch the push part, making it convenient for the user to adjust the locking member. During the removal of the objective lens piece, the push part is pushed to separate the insertion part from the locking hole. The objective lens piece is rotated to the insertion position, and the first clamping block 220 is pulled out along the insertion opening to achieve the removal of the objective lens piece, making it convenient to use and improving the user experience.

In this embodiment, the push part 34 is provided with an inclined friction surface 35, and one side of the friction surface 35 close to the insertion part 31 is lower than one side close to the first elastic member 33. By means of the arrangement of the above structure, the friction surface can increase a friction between the finger of the user and the push part during use, making it more convenient for the user to adjust the push part. The inclined setting of the friction surface facilitates the user to push the push part downwards, so that the user can better apply a force to separate the insertion part from the locking hole.

In this embodiment, the main body further includes an isolation lens. The isolation lens is hermetically connected into the first groove. By means of the arrangement of the above structure, the isolation lens is hermetically mounted in the first groove, which can effectively protect the structures inside the product. Preferably, the isolation lens is a dust-proof and waterproof lens, which can prevent impurities such as dust and water from entering a telescope. This effectively protects components inside the telescope, improves the stability of the product, and prolongs the service life of the product.

Embodiment 2

Figure 23:
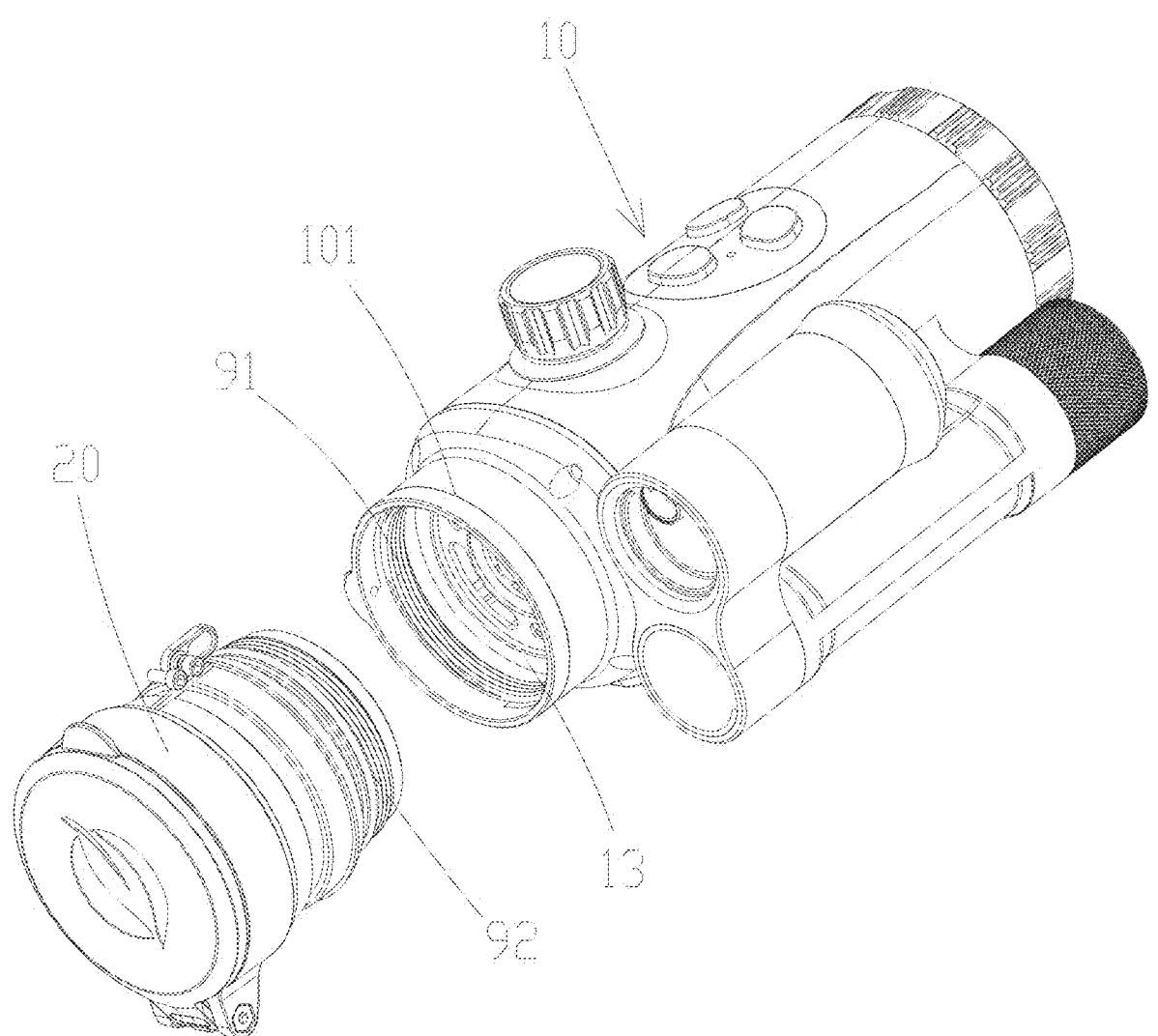
FIG. 23 is an exploded view of Embodiment 2 of the present disclosure.
Figure 24:
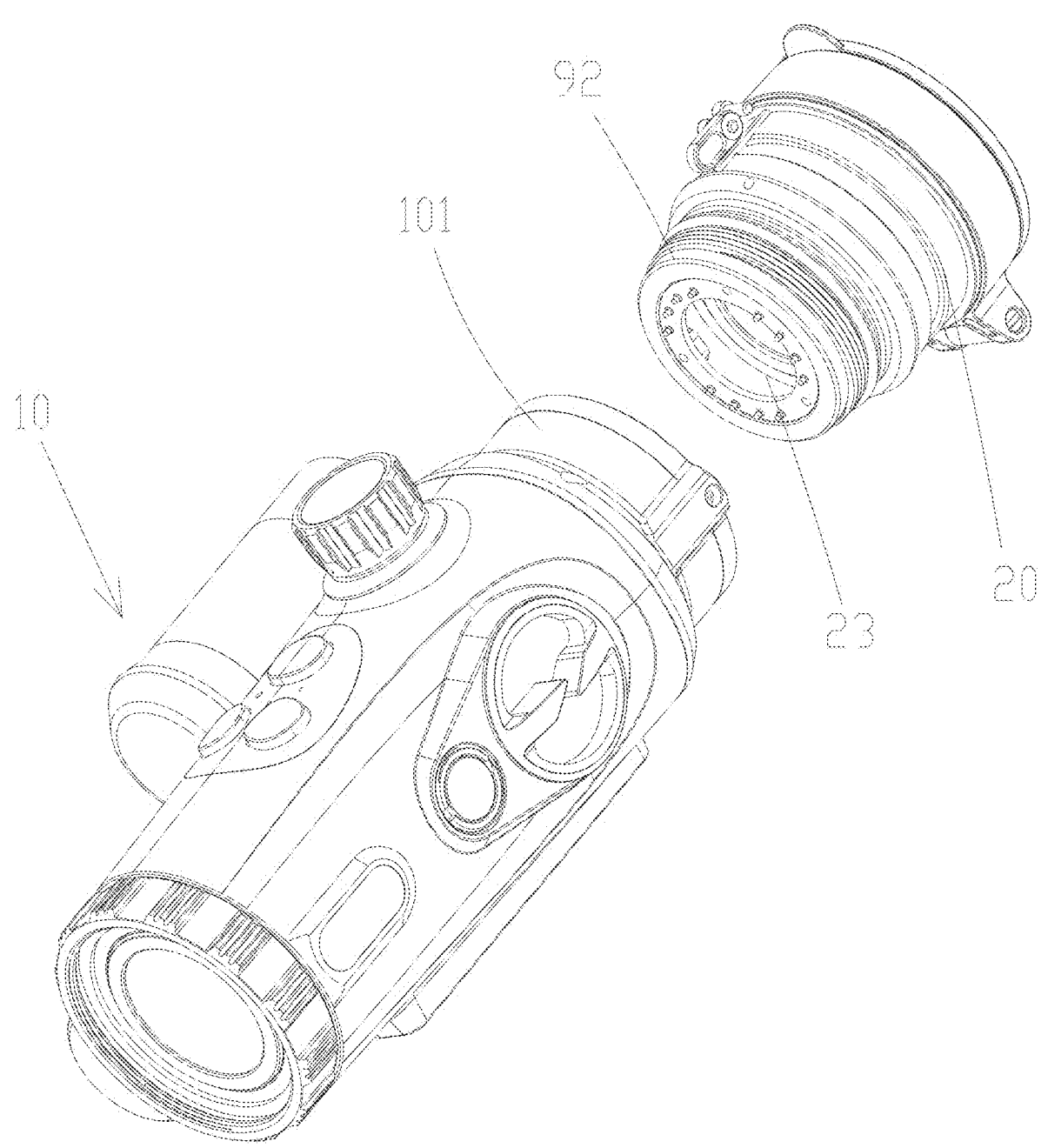
FIG. 24 is another exploded view of Embodiment 2 of the present disclosure.

Referring to FIGS. 23-24, in this embodiment, an end surface of the connection end 101 is provided with a first groove 13; the first electric connection assembly 11 is arranged in the first groove 13; and an inner wall of the first groove 13 is provided with a first thread 91. An end surface of one end of the objective lens piece 20 connected to the main body 10 is provided with a second groove 23; the second electric connection assembly 21 is provided in the second groove 23; an outer wall of the second groove 23 is provided with a second thread 92; and the first groove 13 and the second groove 23 are engaged via the first thread 91 and the second thread 92, so that the objective lens piece 20 is mounted on the main body 10.

By means of the arrangement of the above structure, the objective lens piece 20 is provided with the second groove 23, the outer wall of the second groove 23 is provided with the second thread 92, the end surface of the connection end 101 is provided with the first groove 13, and the inner wall of the first groove 13 is provided with the first thread 91. When the objective lens piece 20 is mounted on the main body 10, the objective lens piece 20 is connected to the main body 10 through the engagement of the second thread 92 and the first thread 91. The first thread 91 and the second thread 92 are simple and reliable in structure, making it convenient for a user to operate and replace the objective lens piece 20, and the production cost is low.

Embodiment 3

Figure 25:
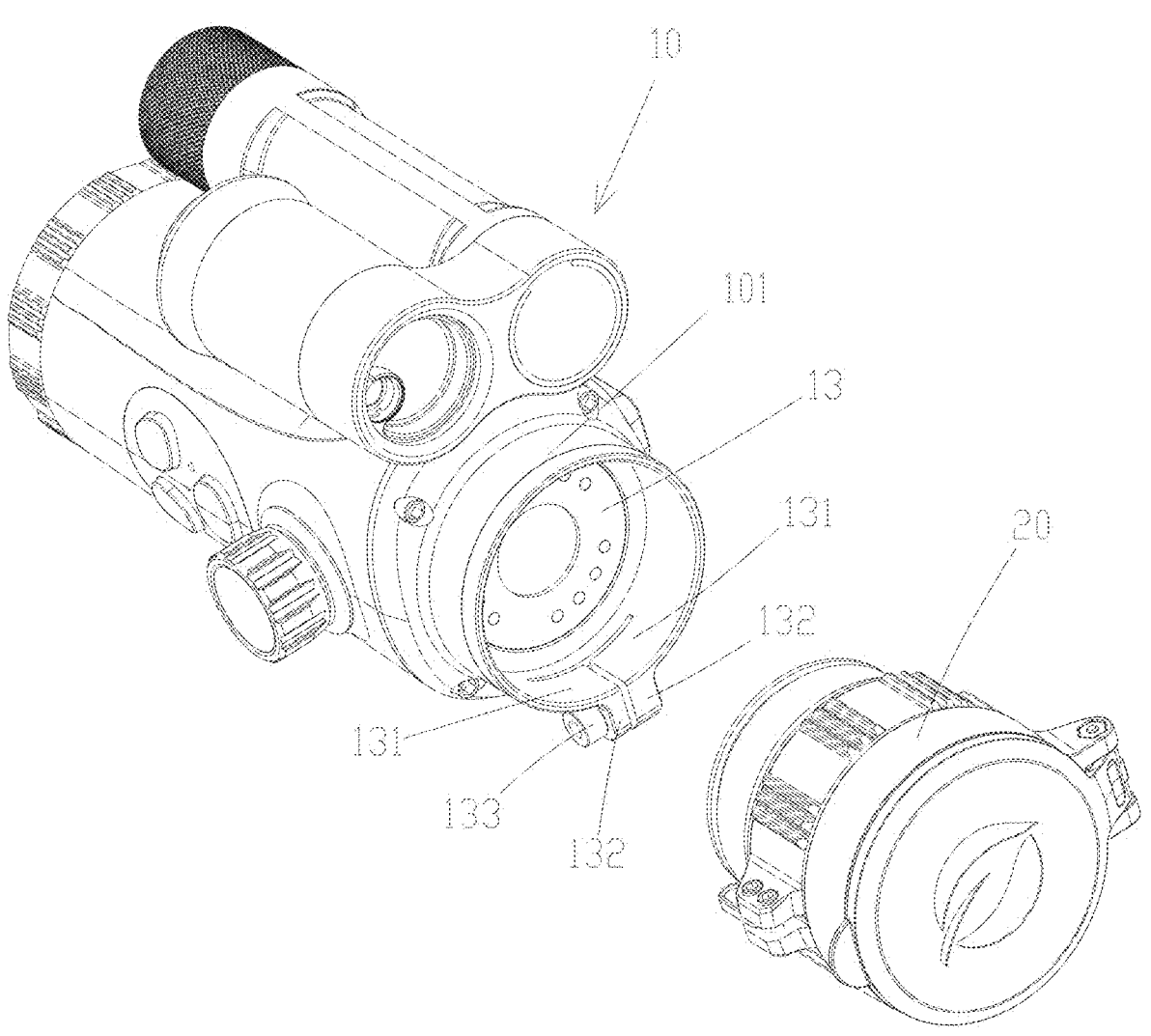
FIG. 25 is an exploded view of Embodiment 3 of the present disclosure.
Figure 26:
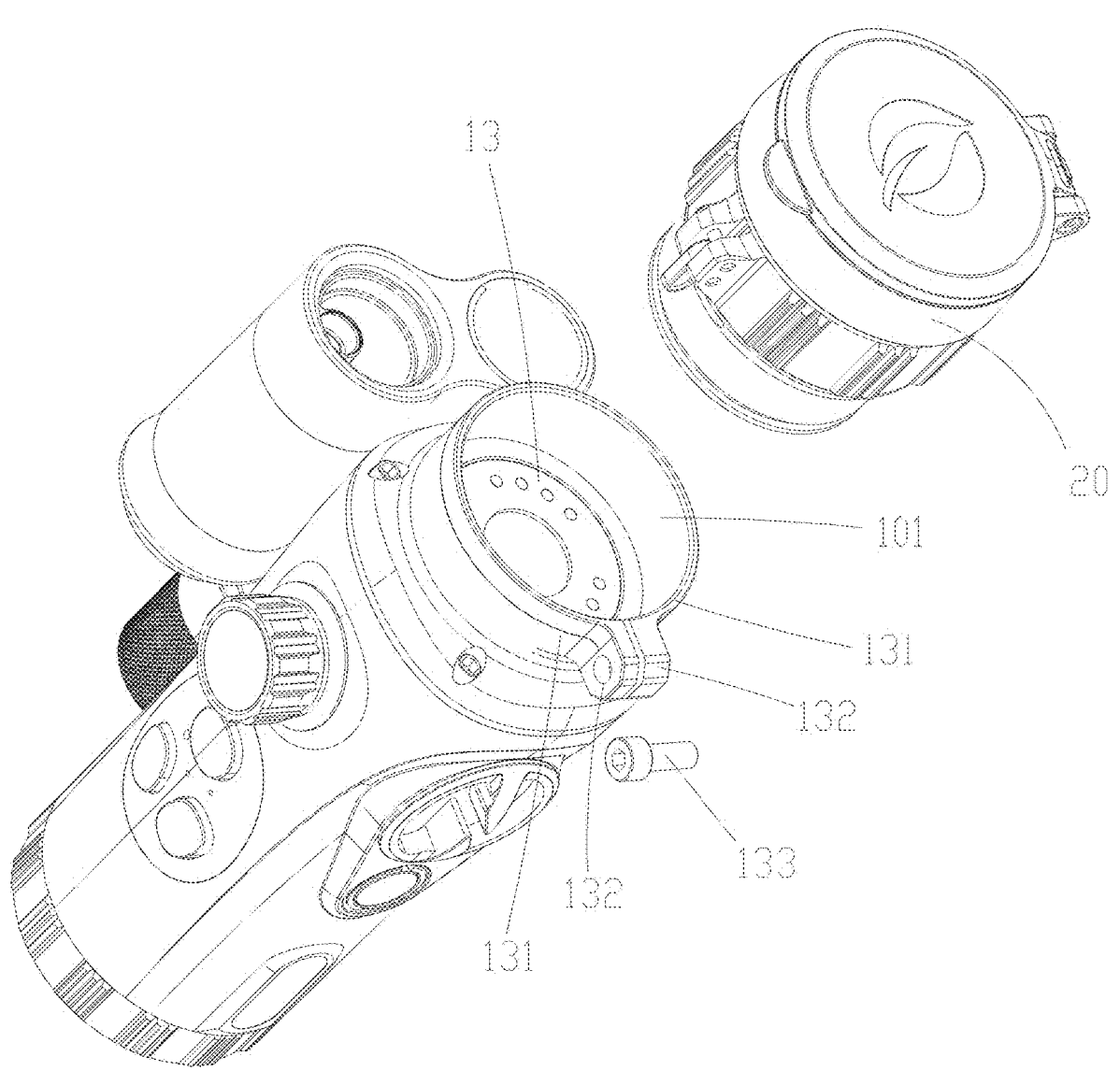
FIG. 26 is another exploded view of Embodiment 3 of the present disclosure.
Figure 27:
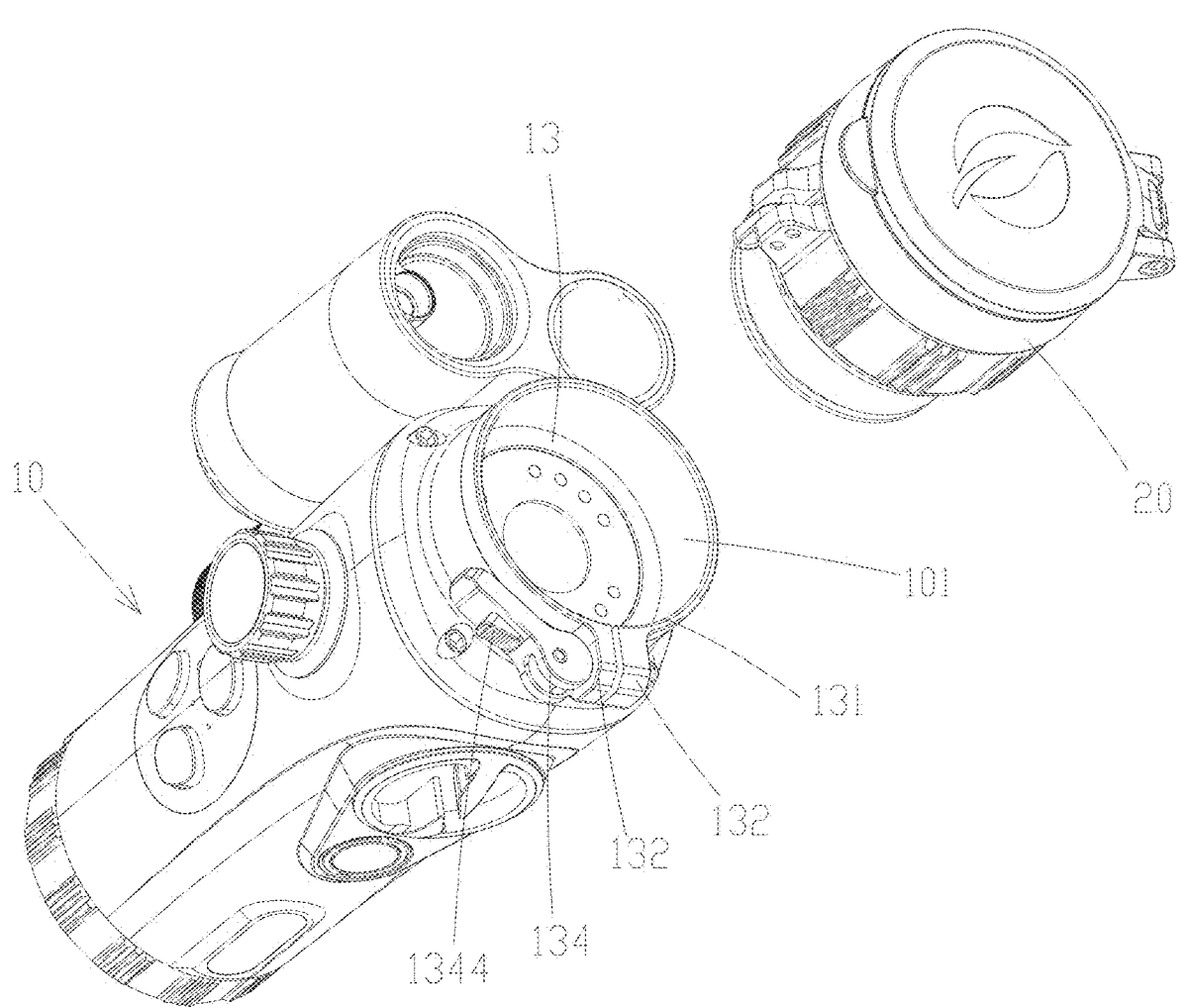
FIG. 27 is an exploded view of Embodiment 4 of the present disclosure.
Figure 28:
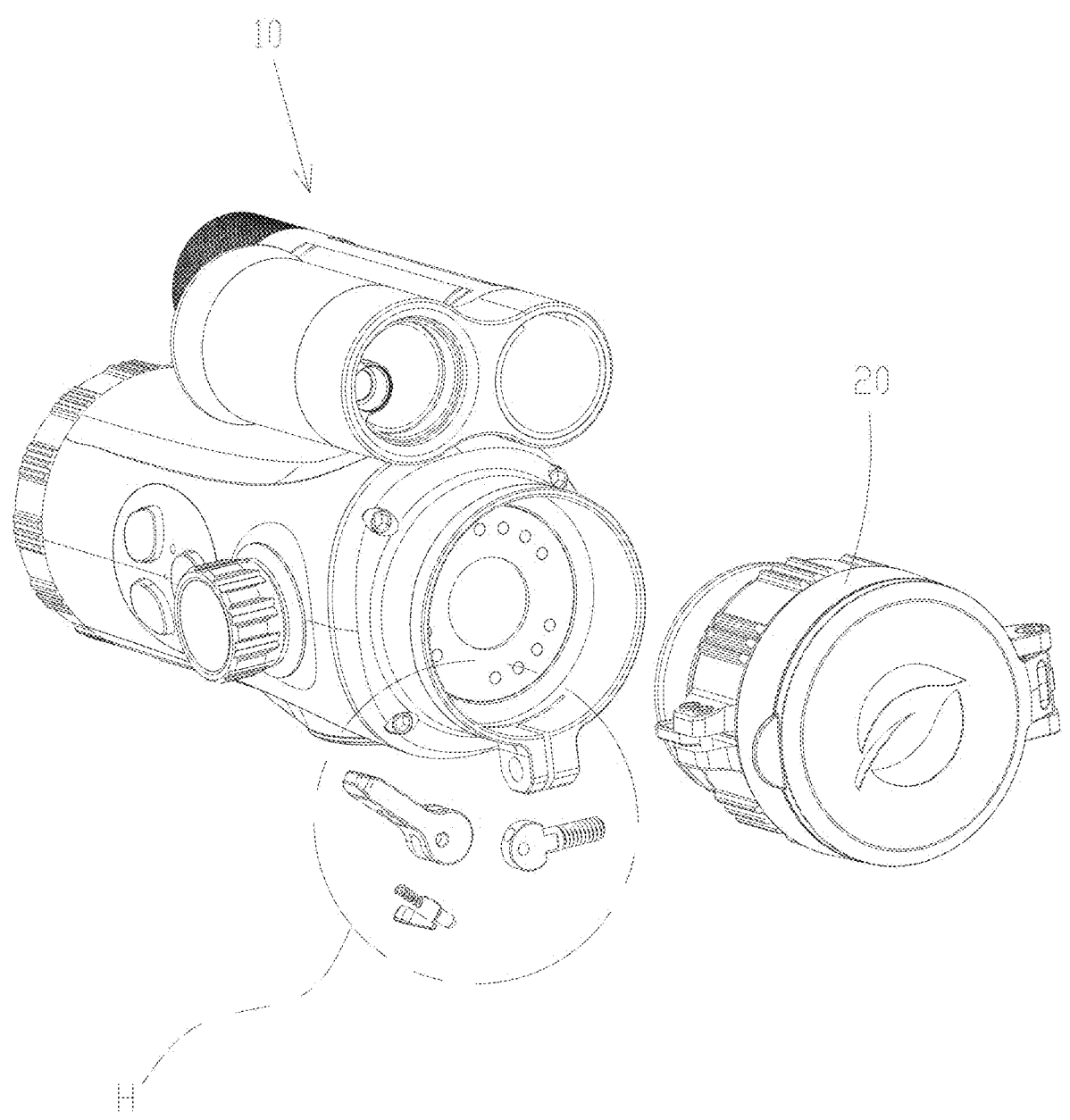
FIG. 28 is another exploded view of Embodiment 4 of the present disclosure.
Figure 29:
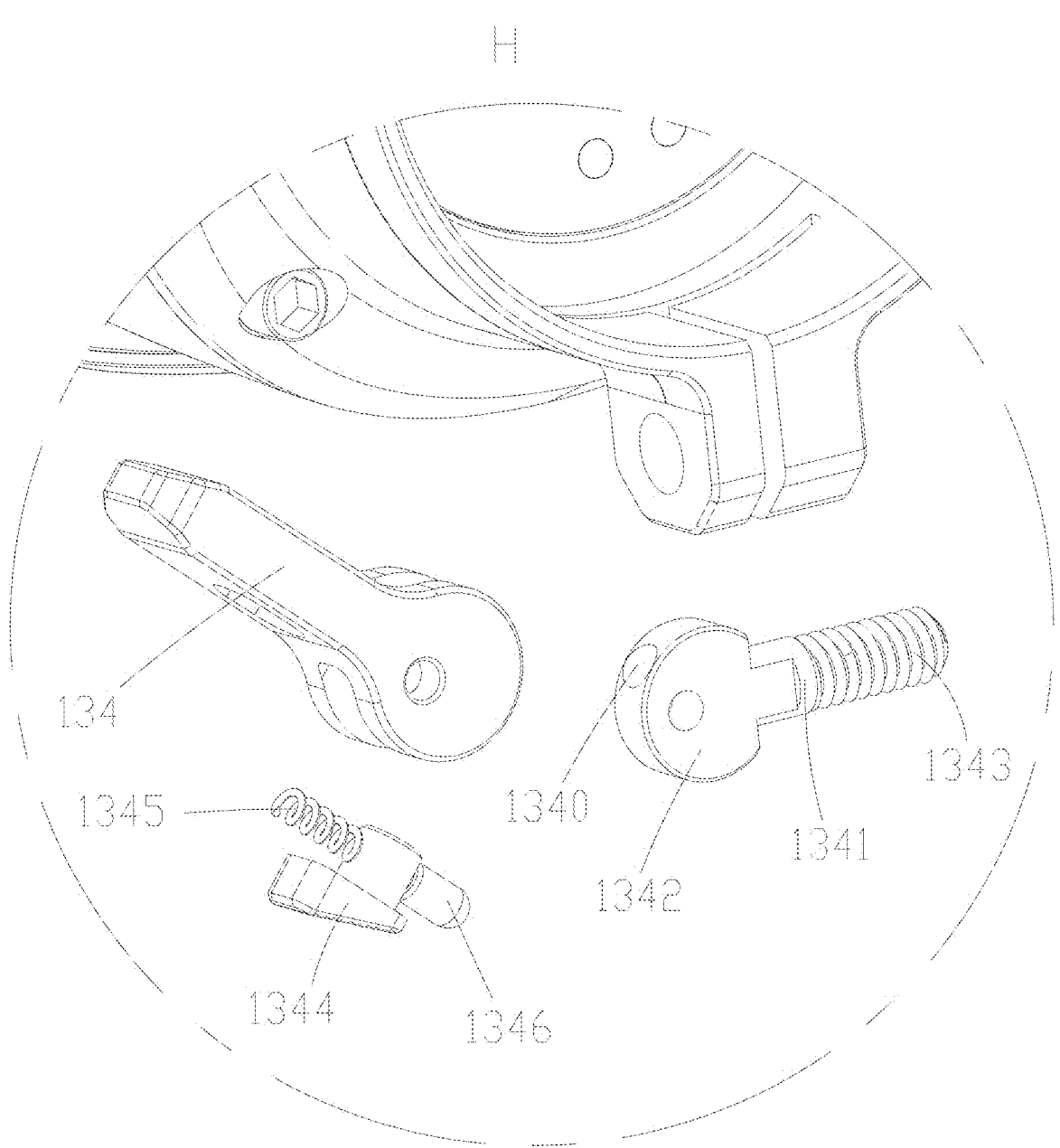
FIG. 29 is an enlarged view of H in FIG. 28.
Figure 30:
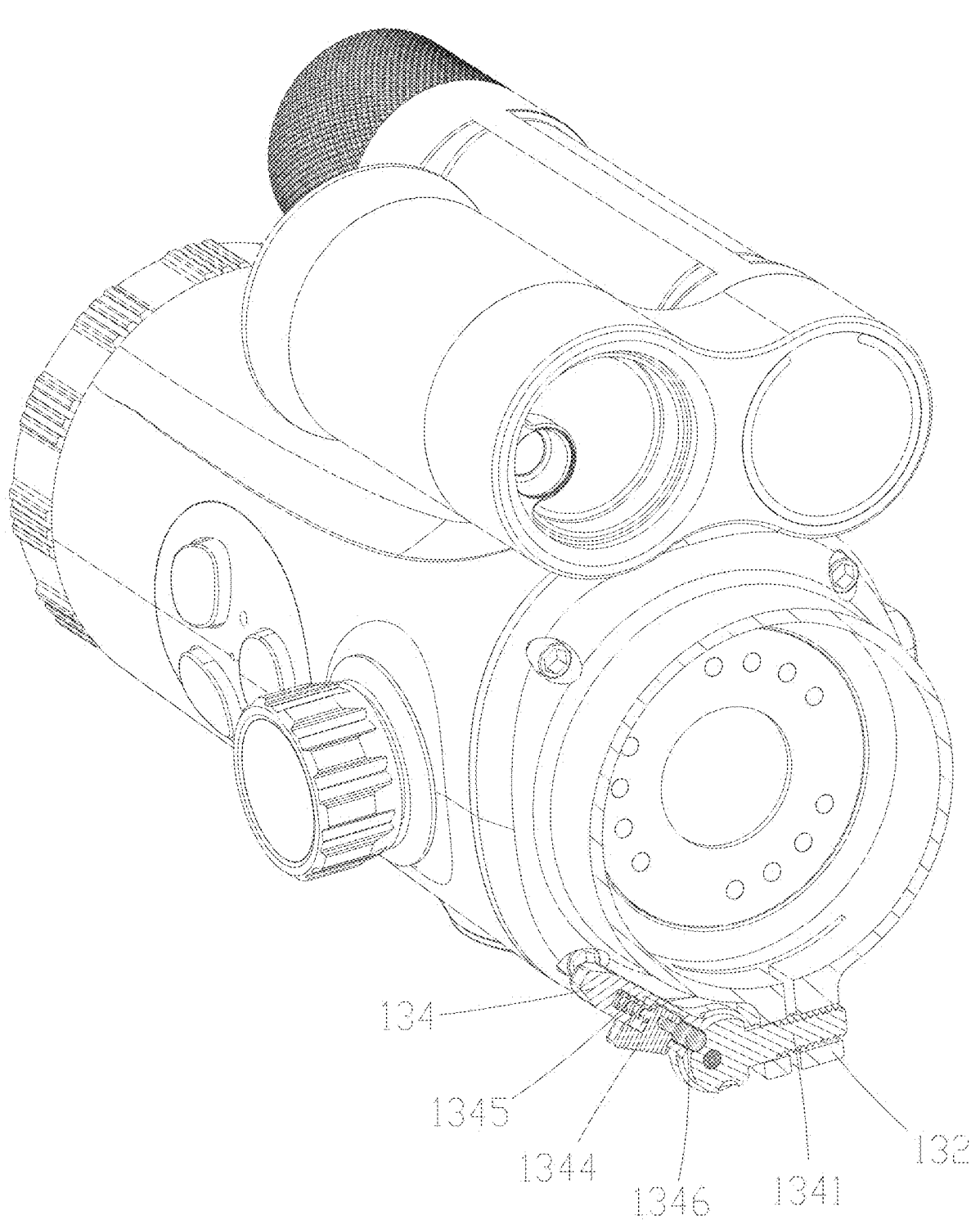
FIG. 30 is a cross-sectional view of Embodiment 4 of the present disclosure.
Figure 31:
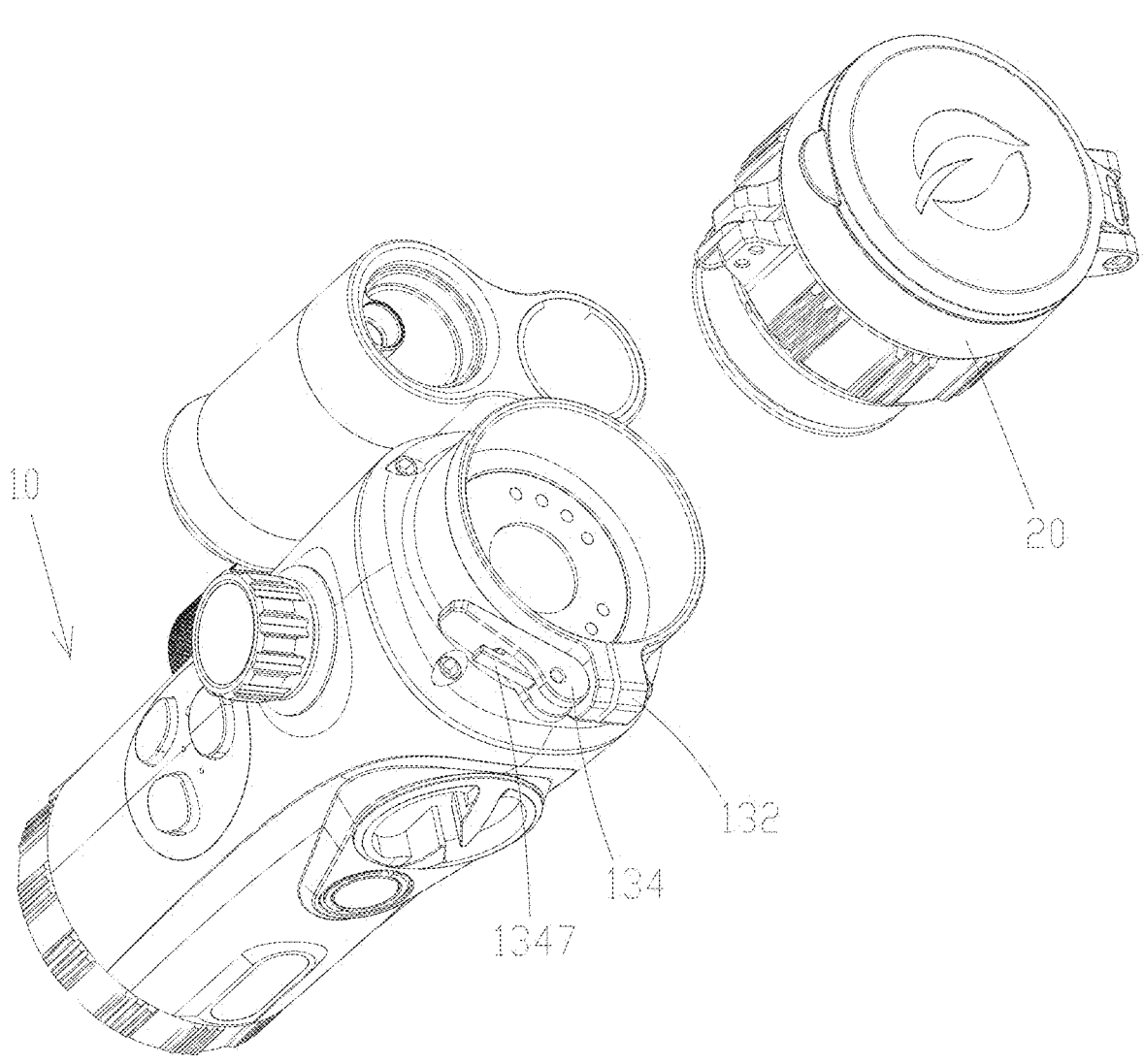
FIG. 31 is another exploded view of Embodiment 4 of the present disclosure.
Figure 32:
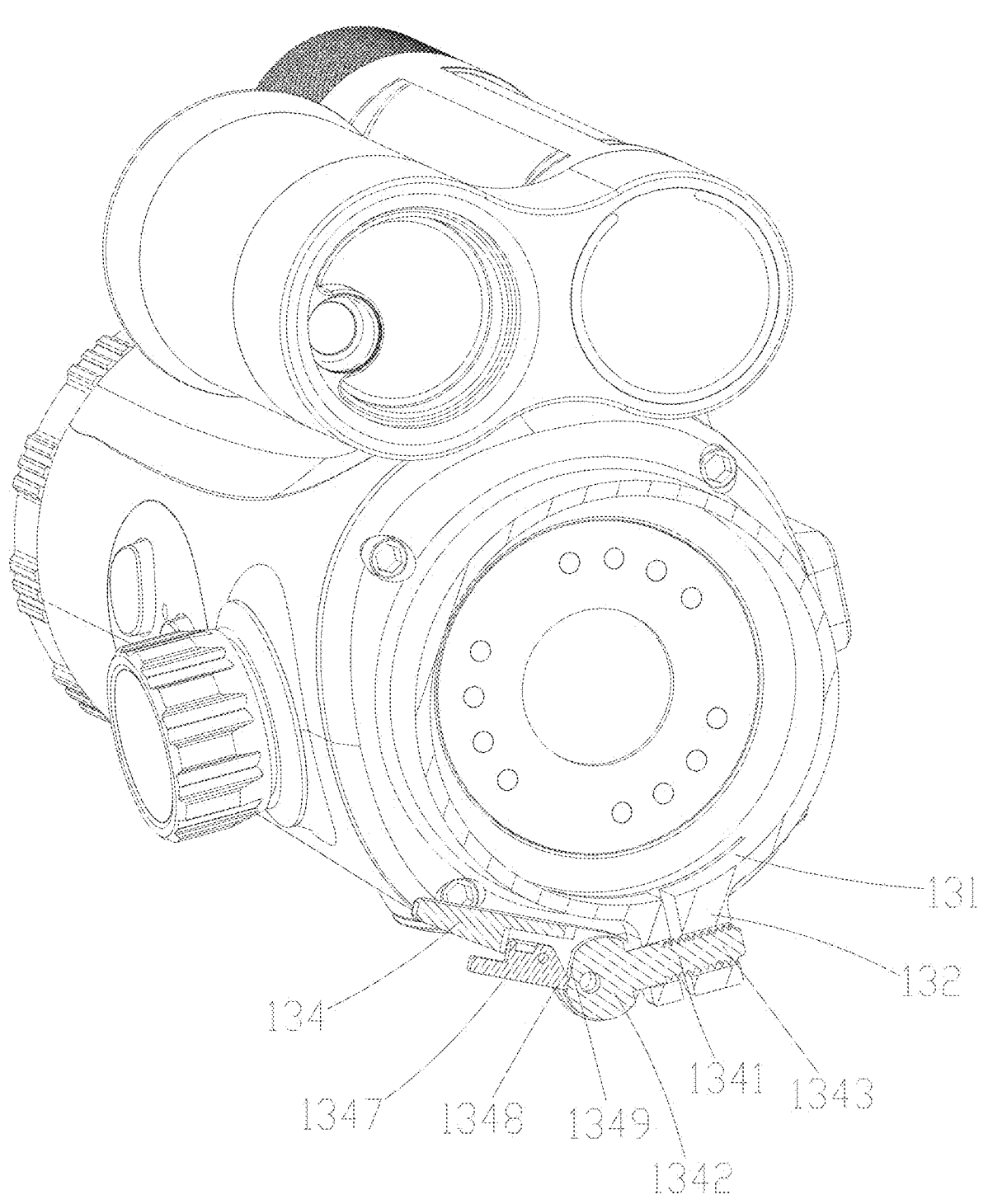
FIG. 32 is another cross-sectional view of Embodiment 4 of the present disclosure.

Referring to FIGS. 25-26, in this embodiment, an end surface of the connection end 101 is provided with a first groove 13, and the first electric connection assembly 11 is arranged in the first groove 13. The first groove 13 includes two extension ends 131; a gap exists between the two extension ends 131; end portions of the extension ends 131 include locking ends 132 protruding outwards; the first groove 13 further includes a fastener 133; and the fastener 133 penetrates through the two locking ends 132. An end surface of one end of the objective lens piece 20 connected to the main body 10 is provided with a second groove 23; the second electric connection assembly 21 is arranged in the second groove 23; and when the first groove 13 is inserted into the second groove 23, the fastener 133 is rotated to enable the two extension ends 131 to be close to each other, so that the second groove 23 abuts against and locks the first groove 13.

By means of the arrangement of the above structure, the end surface of the connection end 101 is provided with the first groove 13; the first groove 13 includes two extension ends 131; a certain distance exists between the two extension ends 131; the end portions of the two extension ends 131 include the locking ends 132 protruding outwards; the fastener 133 penetrates through the two locking ends 132; and after the second groove 23 in the objective lens piece 20 is inserted into the first groove 13, the fastener 133 is rotated to enable the two extension ends 131 to approach each other, so that the second groove 23 locks the first groove 13, allowing the objective lens piece 20 to be connected to the main body 10. By rotating the fastener 133 to move the two extension ends 131 away from each other, the second groove 23 can be unlocked from the first groove 13, allowing the objective lens piece 20 to be detached from the main body 10. The fastener 133 can be a screw, which has a lower production cost. A user can operate the fastener 133 with tools such as wrenches. The design is simple and practical, and the reliability is high.

Embodiment 4

Referring to FIGS. 27-32, in this embodiment, an end surface of the connection end 101 is provided with a first groove 13, and the first electric connection assembly 11 is arranged inside the first groove 13. The first groove 13 includes two extension ends 131; a gap exists between the two extension ends 131; end portions of the extension ends 131 include locking ends 132 protruding outwards; the first groove 13 further includes a locking part 134; the locking part 134 includes a fixing member 1341; the fixing member 1341 includes a first end 1342 and a second end 1343; the locking part 134 is rotatably connected to the first end 1342; the fixing member 1341 is inserted into the two locking ends 132; the second end 1343 is fixedly connected to one of the locking ends 132 far away from the locking part 134; and the locking part 134 abuts against the other locking end 132. An end surface of one end of the objective lens piece 20 connected to the main body 10 is provided with a second groove 23; the second electric connection assembly 21 is arranged in the second groove 23; the locking part 134 is configured to be in a locked position and an unlocked position; and the second groove 23 is arranged in the first groove 13. When the locking part 134 is in the locked position, the locking part 134 presses against an outer wall of the locking end 132 to make the two locking ends 132 approach each other, so that the first groove 13 locks the second groove 23. When the locking part 134 is in the unlocked position, the two locking ends 132 move away from each other to separate the second groove 23 from the first groove 13.

By means of the arrangement of the above structure, the fixing member 1341 is a cylindrical object. The fixing member 1341 includes the first end 1342 and the second end 1343. The fixing member 1341 is inserted into the two locking ends 132. The second end 1343 of the fixing member 1341 is connected to one locking end 132 far away from the locking part 134. The first end 1342 of the fixing member 1341 is rotatably connected to the locking part 134. After the second groove 23 of the objective lens piece 20 is inserted into the first groove 13, the locking part 134 is rotated, the locking part 134 presses against one locking end 132, and the second end 1343 of the fixing member 1341 drives the other locking end 132 to approach the locking part 134, so that the two locking ends 132 move closer to each other until the locking part 134 reaches the locked position, and the first groove 13 locks the second groove 23, allowing the objective lens piece 20 to be fixedly mounted on the main body 10. By rotating the locking part 134 to reach the unlocked position, the two locking ends 132 move away from each other, and the first groove 13 releases the second groove 23, allowing the objective lens piece 20 to be detached from the main body 10. The user can quickly mount and remove the objective lens piece 20 and the main body 10 by operating the locking part 134, enhancing the user experience.

Preferably, the locking part 134 includes a first locking key 1344; the first locking key 1344 is slidably arranged on the locking part 134; the first locking key 1344 includes a second elastic member 1345 and a locking block 1346; and the second elastic member 1345 and the locking block 1346 are slidably arranged inside the locking part 134. One end of the second elastic member 1345 abuts against the locking part 134; an opposite end of the second elastic member 1345 abuts against the first locking key 1344; and the locking block 1346 is arranged on the first locking key 1344. The first end 1342 is provided with a locking hole 1340, and the locking block 1346 is configured to be engaged in the locking hole 1340 to fix a position of the locking part 134.

By means of the arrangement of the above structure, the first locking key 1344 is slidably arranged on the locking part 134; the first locking key 1344 includes the second elastic member 1345; the second elastic member 1345 is slidably disposed in the locking part 134; one end of the second elastic member 1345 abuts against the locking part 134; the opposite end of the second elastic member 1345 abuts against the first locking key 1344; and the second elastic member 1345 is in a compressed state. Preferably, the second elastic member 1345 is a spring. The first locking key 1344 further includes the locking block 1346; and the first end 1342 of the fixing member 1341 is provided with the locking hole 1340. When the locking part 134 is in the locked position, the locking block 1346 is engaged in one locking hole 1340. Since the second elastic member 1345 is compressed to have elasticity, the elasticity enables the locking block 1346 to be fixedly engaged in the locking hole 1340. At this time, the locking part 134 is locked and cannot rotate. By sliding the first locking key 1344 to compress the second elastic member 1345, the locking block 1346 disengages from the locking hole 1340. At this point, the locking part 134 can rotate. When the locking part 134 rotates to the unlocked position, the locking block 1346 is once again engaged in another locking hole 1340, so that the locking part 134 is locked and cannot rotate. By arranging the first locking key 1344, the locking part 134 can be accurately fixed in the locked position and unlocked position, and the user will not cause the locking part 134 to leave the locked position due to accidental touch, thereby preventing the objective lens piece 20 from falling off and causing damage, and providing a safe guarantee for user use.

Preferably, the locking part 134 further includes a second locking key 1347, and the second locking key 1347 is rotatably connected to the locking part 134. The second locking key 1347 includes an abutting end 1348 protruding outwards, and the first end 1342 is provided with an abutting surface 1349. When the abutting end 1348 is pressed against the abutting surface 1349, the position of the locking part 134 is fixed.

By means of the arrangement of the above structure, the second locking key 1347 is rotatably connected to the locking part 134, and the second locking key 1347 includes the abutting end 1348 protruding outwards. The first end 1342 of the fixing member 1341 is provided with the abutting surface 1349. When in use, the second locking key 1347 is rotated to cause the abutting end 1348 to press against the abutting surface 1349, so that the locking part 134 is fixed in position and cannot rotate. When unlocking, simply rotate the second locking key 1347 to disengage the abutting end 1348 from the abutting surface 1349, and then the locking part 134 can rotate. By arranging the second locking key 1347, the locking part 134 can be fixed in any position at any time, and the position of the locking part 134 will not be changed by the user due to accidental touch, thereby preventing losses and providing a safe guarantee for user use.

Embodiment 5

Figure 33:
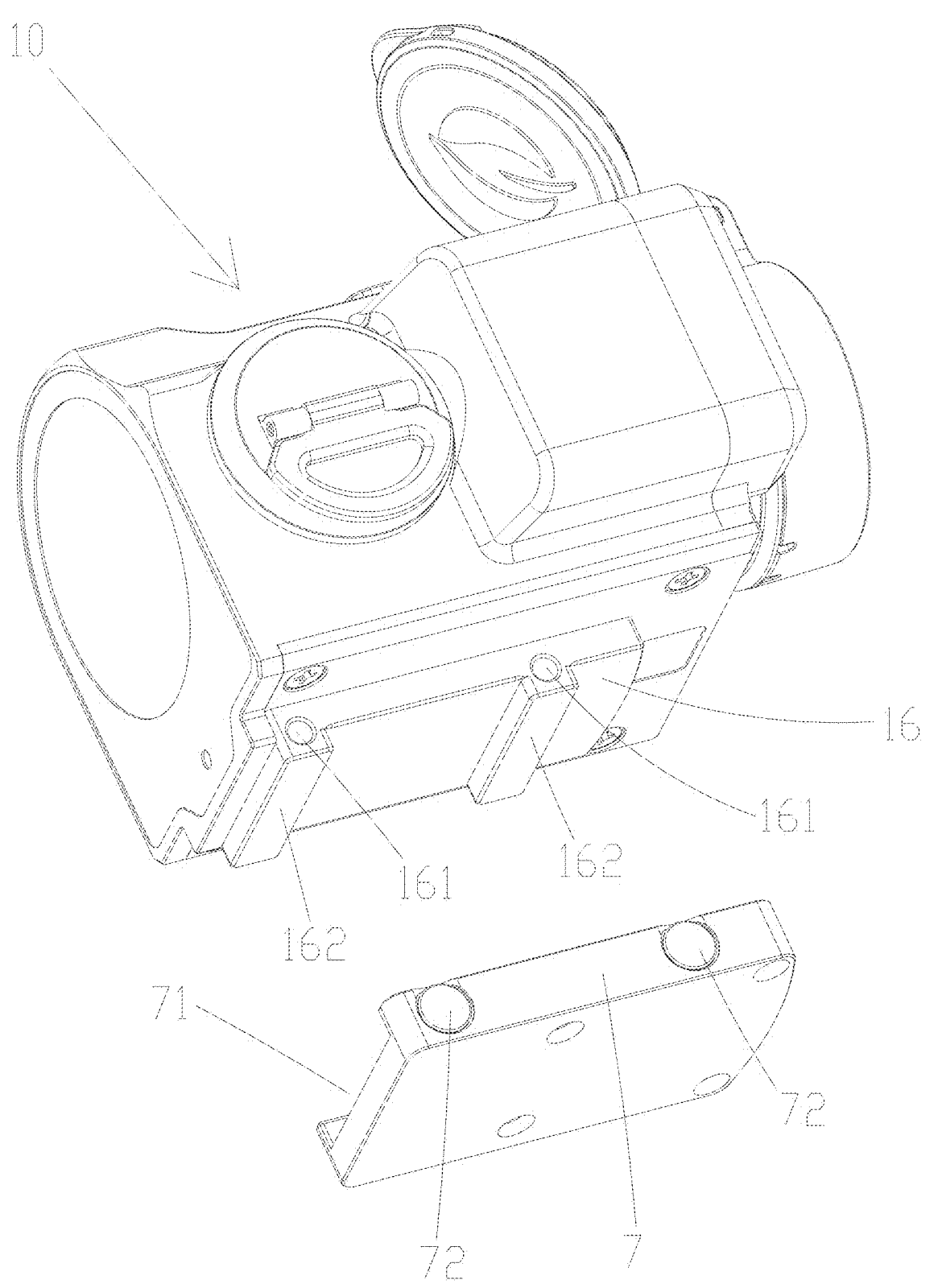
FIG. 33 is an exploded view of Embodiment 5 of the present disclosure.
Figure 34:
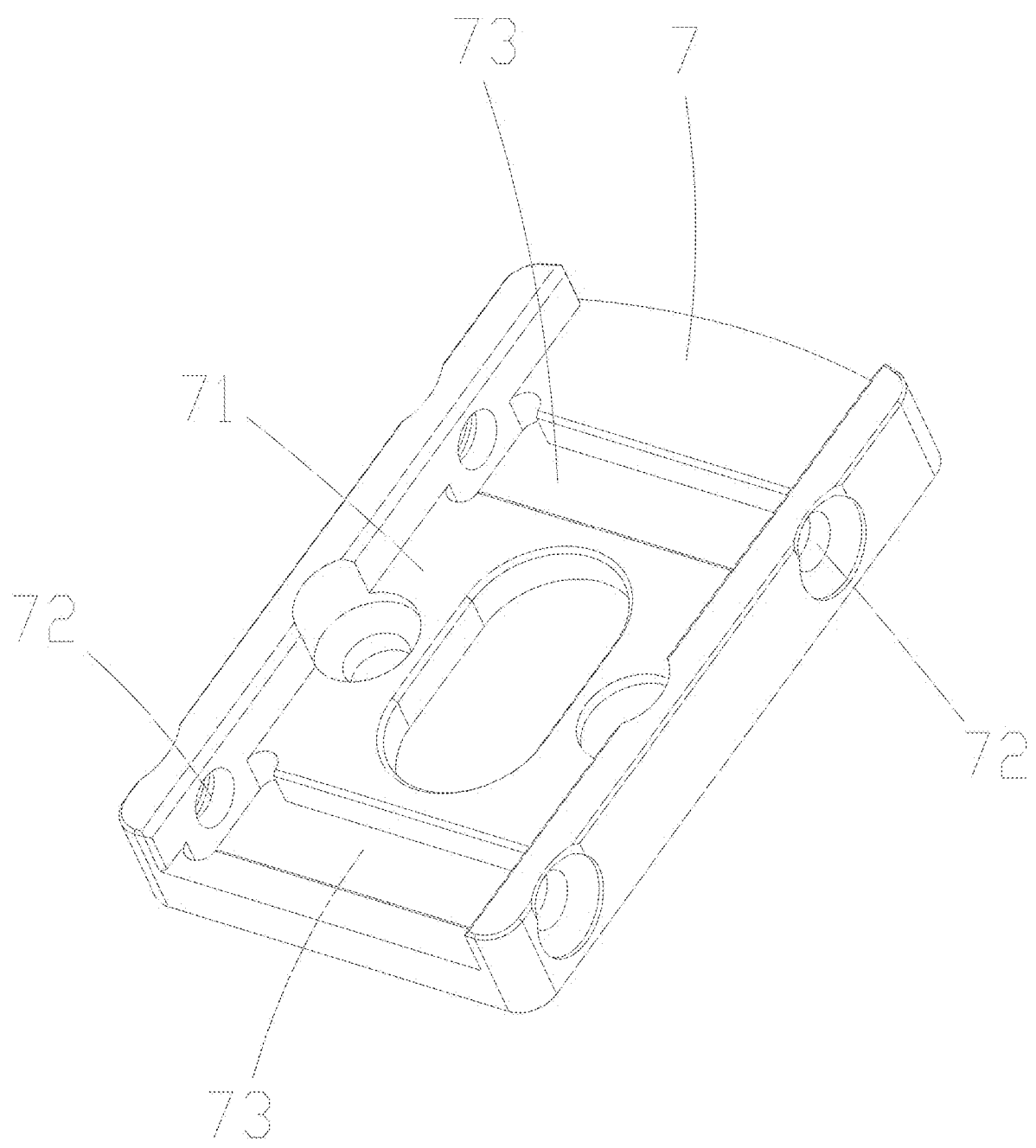
FIG. 34 is a perspective view of a base according to Embodiment 5 of the present disclosure.
Figure 35:
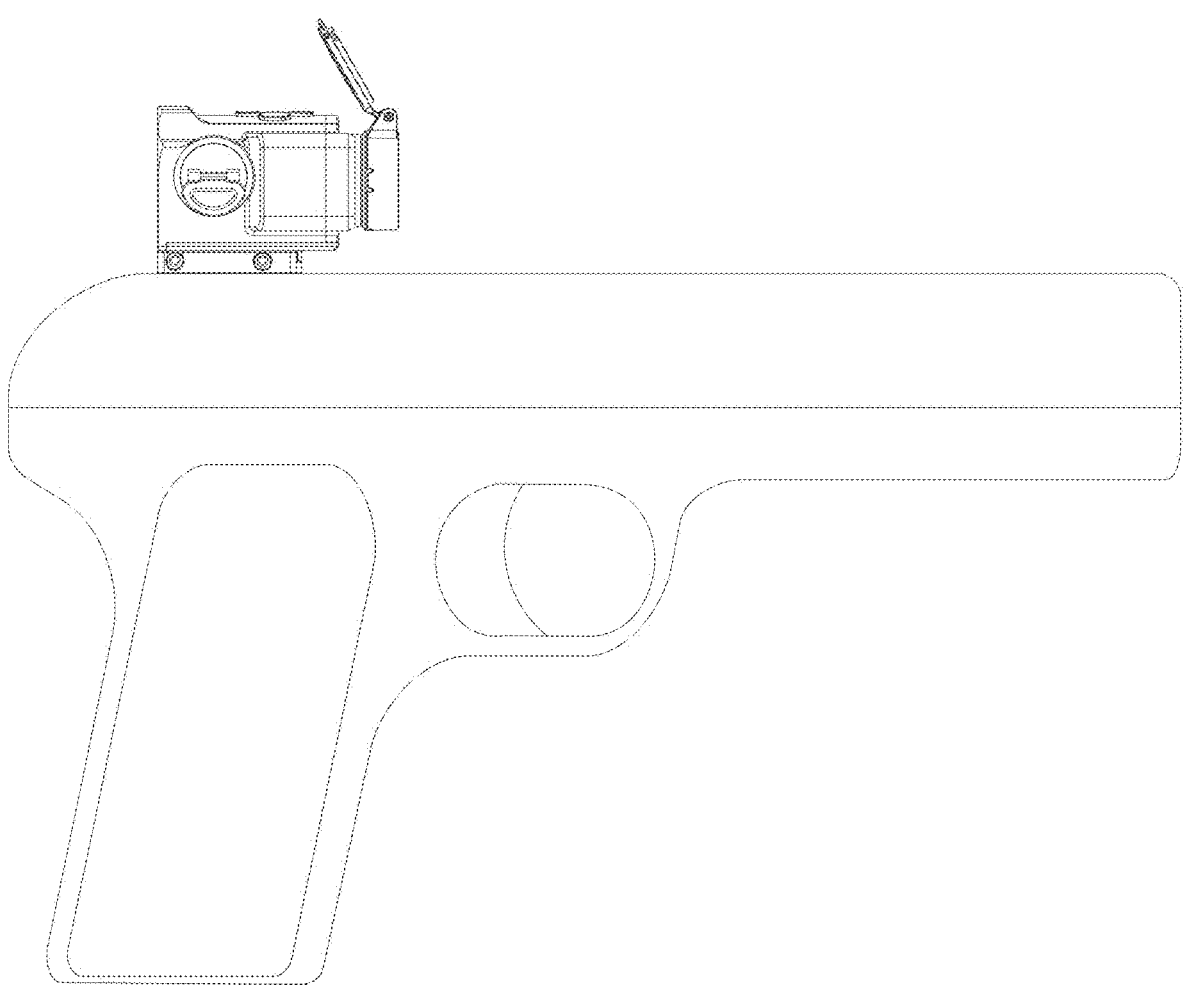
FIG. 35 is a use state diagram of a combination of a sight and a pistol in Embodiment 5 of the present disclosure.

Referring to FIGS. 33-35, in this embodiment, the sight further includes a base 7; the base 7 is detachably connected to the main body 10; the base 7 is configured to be fixed on a pistol; and the sight is detachably connected to the pistol through the base 7. Specifically, the base 7 includes a mounting slot 71; a lower part of the main body 10 includes a connection part 16; a size of the connection part 16 matches a size of the mounting slot 71; and the connection part 16 is configured to be arranged in the mounting slot 71. The connection part 16 includes a second mounting hole 161; and the base 7 includes a first mounting hole 72. After the connection part 16 is mounted in the mounting groove 71, a position of the first mounting hole 72 corresponds to a position of the second mounting hole 161. At this time, a fastener is inserted into the first mounting hole 72 and the second mounting hole 161 to fixedly connect the main body 10 to the base 7. The base 7 can also be connected to the pistol through the fastener, so that the sight can be mounted on the pistol. Preferably, a clamping slot 73 is defined in the mounting slot 71, and a second clamping block 162 is provided on the connection part 16. When the connection part 16 is mounted in the mounting slot 71, the second clamping block 162 is clamped in the clamping slot 73. By clamping the second clamping block 162 in the clamping slot 73, the connection between the connection part 16 and the mounting slot 71 can be more stable.

By means of the arrangement of the above structure, the sight can be detachably mounted on the pistol through the base 7, the structure is simple and reliable, the user can conveniently install and disassemble the sight, and the user experience is improved.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein the end surface of the connection end is provided with a first groove; the first electric connection assembly and the first connection member are both arranged in the first groove; an end surface of one end of the objective lens piece connected to the main body is provided with a second groove; the second connection member and the second electric connection assembly are both arranged in the second groove; and when the objective lens piece is mounted on the main body, the second groove wraps around the first groove or the first groove wraps around the second groove.

2. The sight according to claim 1, wherein the first connection member comprises a clamping port; the clamping port is arranged on a side wall of the first groove; the second connection member comprises a first clamping block and a hollow mounting column; two ends of the mounting column are communicated to each other; the mounting column is arranged in the second groove; the second electric connection assembly is arranged in a through hole of the mounting column; the first clamping block is arranged around an outer side of the mounting column; a gap exists between an end socket of the first clamping block and a side wall of the second groove; the gap accommodates the side wall of the first groove; when the objective lens piece is mounted on the main body, the side wall of the first groove is mounted in the gap, and the second groove wraps around the first groove; or the first connection member comprises a clamping block and a hollow mounting column; two ends of the mounting column are communicated to each other; the mounting column is arranged in the first groove; the first clamping block is arranged around an outer side of the mounting column; a gap exists between an end socket of the first clamping block and the side wall of the first groove; the gap accommodates a side wall of the second groove; and when the objective lens piece is mounted on the main body, the side wall of the second groove is mounted in the gap, and the first groove wraps around the second groove.

3. The sight according to claim 2, wherein the clamping port comprises an insertion opening and a sliding rail; the insertion opening is communicated to the sliding rail; the first clamping block is inserted along the insertion opening into the sliding rail and slides in the sliding rail; and the first clamping block is abutted to a side wall of the sliding rail.

4. The sight according to claim 1, wherein the sight further comprises a locking member; the locking member is slidably arranged on the main body; one end of the locking member is located in the first groove; the second groove is internally provided with a locking hole; the locking member has a locked position and an unlocked position; when the locking member is in the locked position, the end of the locking member located in the first groove is inserted into the locking hole; and when the locking member is in the unlocked position, the end of the locking member located in the first groove is separated from the locking hole.

5. The sight according to claim 4, wherein the locking member comprises an insertion part, a sliding part, and a first elastic member; a sliding space is arranged in the main body; the sliding part slides in the sliding space; the insertion part is arranged at one end of the sliding part and is located in the first groove; the first elastic member is abutted to an opposite end of the sliding part; and when the objective lens piece is rotated to a mounting position, the first elastic member pushes the sliding part to insert the insertion part into the locking hole.

6. The sight according to claim 5, wherein a surface of the main body is provided with a sliding slot; the sliding slot is communicated to the sliding space; a surface of the sliding part is convexly provided with a push part; and the push part is threaded out of the sliding slot.

7. The sight according to claim 6, wherein the push part is provided with an inclined friction surface, and one side of the friction surface close to the insertion part is lower than one side close to the first elastic member.

8. The sight according to claim 1, wherein the sight is a digital sight; the digital sight further comprises a liquid crystal display device and a CMOS image sensing device; the liquid crystal display device and the CMOS image sensing device are arranged in the main body; and the liquid crystal display device and the CMOS image sensing device are electrically connected.

9. The sight according to claim 1, wherein the sight is a night vision sight; the night vision sight further comprises a first night vision device; and the first night vision device is arranged in the main body.

10. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein the sight is a dual-lens sight; the main body of the dual-lens sight comprises two connection ends; the two connection ends are arranged side by side; the dual-lens sight further comprises a vanadium oxide detector device and a second night vision device; the second night vision device is arranged in one of the connection ends; and the vanadium oxide detector device is arranged in the other connection end.

11. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein an end surface of the connection end is provided with a first groove; the first electric connection assembly is arranged in the first groove; an inner wall of the first groove is provided with a first thread; an end surface of one end of the objective lens piece connected to the main body is provided with a second groove; the second electric connection assembly is provided in the second groove; an outer wall of the second groove is provided with a second thread; and the first groove and the second groove are engaged via the first thread and the second thread, so that the objective lens piece is mounted on the main body.

12. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein an end surface of the connection end is provided with a first groove; the first electric connection assembly is arranged in the first groove; the first groove comprises two extension ends; a gap exists between the two extension ends; end portions of the extension ends comprise locking ends protruding outwards; the first groove further comprises a fastener; the fastener penetrates through the two locking ends; an end surface of one end of the objective lens piece connected to the main body is provided with a second groove; the second electric connection assembly is arranged in the second groove; and when the first groove is inserted into the second groove, the fastener is rotated to enable the two extension ends to be close to each other, so that the second groove abuts against and locks the first groove.

13. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein an end surface of the connection end is provided with a first groove; the first electric connection assembly is arranged inside the first groove; the first groove comprises two extension ends; a gap exists between the two extension ends; end portions of the extension ends comprise locking ends protruding outwards; the first groove further comprises a locking part; the locking part comprises a fixing member; the fixing member comprises a first end and a second end; the locking part is rotatably connected to the first end; the fixing member is inserted into the two locking ends; the second end is fixedly connected to one of the locking ends far away from the locking part; the locking part abuts against the other locking end; an end surface of one end of the objective lens piece connected to the main body is provided with a second groove; the second electric connection assembly is arranged in the second groove; the locking part is configured to be in a locked position and an unlocked position; the second groove is arranged in the first groove; when the locking part is in the locked position, the locking part presses against an outer wall of the locking end to make the two locking ends approach each other, so that the first groove locks the second groove; and when the locking part is in the unlocked position, the two locking ends move away from each other to separate the second groove from the first groove.

14. The sight according to claim 13, wherein the locking part comprises a first locking key; the first locking key is slidably arranged on the locking part; the first locking key comprises a second elastic member and a locking block; the second elastic member and the locking block are slidably arranged inside the locking part; one end of the second elastic member abuts against the locking part; an opposite end of the second elastic member abuts against the first locking key; the locking block is arranged on the first locking key; the first end is provided with a locking hole; and the locking block is configured to be engaged in the locking hole to fix a position of the locking part.

15. The sight according to claim 13, wherein the locking part comprises a second locking key; the second locking key is rotatably connected to the locking part; the second locking key comprises an abutting end protruding outwards; the first end is provided with an abutting surface; and when the abutting end is pressed against the abutting surface, a position of the locking part is fixed.

16. The sight according to claim 1, wherein the sight further comprises a base; the base is detachably connected to the main body; and the base is used for connecting an external object.

17. A sight, wherein the sight comprises:

a main body, wherein the main body comprises a connection end; a first electric connection assembly is arranged on an end surface of the connection end; a first connection member is arranged around the first electric connection assembly; and an objective lens piece, wherein a second electric connection assembly is arranged on one end surface of the objective lens piece; a second connection member is arranged around the second electric connection assembly; the second connection member is detachably connected in the first connection member to make the objective lens piece detachably connected to the main body; and when the second connection member is connected in the first connection member, the second electric connection assembly is abutted to the first electric connection assembly to make the objective lens piece electrically connected to the main body;

wherein the sight further comprises a base; the base is detachably connected to the main body; and the base is used for connecting an external object;

wherein the base comprises a mounting slot; a lower part of the main body comprises a connection part; the connection part is configured to be arranged in the mounting slot; the base comprises a first mounting hole; the connection part comprises a second mounting hole; and when the connection part is mounted in the mounting slot, the first mounting hole corresponds to the second mounting hole in position.

18. The sight according to claim 17, wherein the mounting slot comprises a clamping slot; the connection part comprises a second clamping block; and the second clamping block is configured to be mounted in the clamping slot.

* * * * *